United States Patent
Ye et al.

(10) Patent No.: US 11,113,840 B2
(45) Date of Patent: Sep. 7, 2021

(54) SYSTEMS AND METHODS FOR DETECTING OBJECTS IN IMAGES

(71) Applicant: ZHEJIANG DAHUA TECHNOLOGY CO., LTD., Zhejiang (CN)

(72) Inventors: Xin Ye, Hangzhou (CN); Songlin Yang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 147 days.

(21) Appl. No.: 16/457,861

(22) Filed: Jun. 28, 2019

(65) Prior Publication Data
US 2019/0325605 A1    Oct. 24, 2019

Related U.S. Application Data

(63) Continuation of application No. PCT/CN2017/107043, filed on Oct. 20, 2017.

(30) Foreign Application Priority Data

Dec. 29, 2016   (CN) .......................... 201611248557.2
Dec. 29, 2016   (CN) .......................... 201611249792.1

(51) Int. Cl.
*G06T 7/73* (2017.01)
*G06K 9/00* (2006.01)
(Continued)

(52) U.S. Cl.
CPC ............ *G06T 7/73* (2017.01); *G06K 9/00832* (2013.01); *G06K 9/42* (2013.01); *G06K 9/6256* (2013.01);
(Continued)

(58) Field of Classification Search
CPC ............ G06T 7/73; G06T 2207/20081; G06T 2207/20084; G06K 9/00832; G06K 9/42;
(Continued)

(56) References Cited

U.S. PATENT DOCUMENTS 10,628,961 B2 *   4/2020   Sundaresan .............. G06T 7/74
2017/0206431 A1*  7/2017   Sun .................... G06F 16/5838
(Continued)

FOREIGN PATENT DOCUMENTS

CN    104517113 A    4/2015
CN    105551047 A    5/2016
(Continued)

OTHER PUBLICATIONS

C. Szegedy et al., Deep Neural Networks for Object Detection, IEEE Computer Society Conference on Computer Vision and Pattern Recognition. Proceedings, 1-9, 2013.
(Continued)

*Primary Examiner* — Wesley J Tucker
(74) *Attorney, Agent, or Firm* — Metis IP LLC

(57) ABSTRACT

A method configured to implemented on at least one image processing device for detecting objects in images includes obtaining an image including an object. The method also includes generating one or more feature vectors related to the image based on a first convolutional neural network, wherein the one or more feature vectors includes a plurality of parameters. The method further includes determining the position of the object based on at least one of the plurality of parameters. The method still further includes determining a category associated with the object based on at least one the plurality of parameters.

19 Claims, 17 Drawing Sheets

(51) Int. Cl.
*G06K 9/42* (2006.01)
*G06K 9/62* (2006.01)

(52) U.S. Cl.
CPC ......... *G06K 9/6261* (2013.01); *G06K 9/6277* (2013.01); *G06T 2207/20081* (2013.01); *G06T 2207/20084* (2013.01)

(58) Field of Classification Search
CPC .. G06K 9/6256; G06K 9/6261; G06K 9/6277; G06K 9/628; G06K 9/3233; G06N 3/0454; G06N 3/08
See application file for complete search history.

(56) References Cited

U.S. PATENT DOCUMENTS

| | | | |
|---|---|---|---|
| 2018/0018539 A1 | 1/2018 | Chen et al. | |
| 2018/0025249 A1* | 1/2018 | Liu | G06N 3/04 382/158 |
| 2018/0039853 A1* | 2/2018 | Liu | G06K 9/72 |
| 2018/0121762 A1* | 5/2018 | Han | G06K 9/52 |
| 2018/0173971 A1* | 6/2018 | Jia | G06K 9/6288 |
| 2018/0232587 A1* | 8/2018 | Wang | G06K 9/00771 |
| 2019/0147262 A1* | 5/2019 | Kuehnle | G07C 5/008 340/439 |
| 2019/0225186 A1* | 7/2019 | Szawarski | G06K 9/00845 |
| 2020/0143563 A1* | 5/2020 | Liu | G06K 9/00805 |
| 2020/0394458 A1* | 12/2020 | Yu | G06N 3/084 |
| 2021/0086715 A1* | 3/2021 | Baek | B60R 21/01544 |

FOREIGN PATENT DOCUMENTS

| | | |
|---|---|---|
| CN | 105740910 A | 7/2016 |
| CN | 105975931 A | 9/2016 |
| CN | 106095884 A | 11/2016 |
| CN | 106127159 A | 11/2016 |
| CN | 106203283 A | 12/2016 |
| CN | 106228158 A | 12/2016 |
| CN | 106803071 A | 6/2017 |
| WO | 2015177268 A1 | 11/2015 |

OTHER PUBLICATIONS

A. Krizhevsky et al., ImageNet Classification with Deep Convolutional Neural Networks, Advances in Neural Information Processing Systems 25, 1097-1105, 2012.

D. Erhan et al., Scalable Object Detection Using Deep Neural Networks, 2014 IEEE Conference on Computer Vision and Pattern Recognition, 2155-2162, 2014.

Extended European Search Report in European Application No. 17888017.7 dated Oct. 24, 2019, 8 pages.

International Search Report in PCT/CN2017/107043 dated Dec. 28, 2017, 4 pages.

Written Opinion in PCT/CN2017/107043 dated Dec. 28, 2017, 5 pages.

Russell Stewart et al., End-to-end People Detection In Crowded Scenes, https://arxiv.org/abs/1506.04878, 2015, 9 pages.

* cited by examiner

360

```
361
┌─────────────────────────────────────────────┐
│ Inputting an image into a convolutional neural network, │
│ and determine a feature vector corresponding to a │
│              region proposal in              │
│                 the image                    │
└─────────────────────────────────────────────┘
                       │
                       ▼
362
┌─────────────────────────────────────────────┐
│ Determining category and position of an object in the │
│       image based on the feature vector      │
└─────────────────────────────────────────────┘
```

FIG. 3D

SYSTEMS AND METHODS FOR DETECTING OBJECTS IN IMAGES

CROSS-REFERENCE TO RELATED APPLICATIONS

This application is a Continuation of International Application No. PCT/CN2017/107043, filed on Oct. 20, 2017, which claims priority of Chinese Patent Application No. 201611248557.2, filed on Dec. 29, 2016, and Chinese Patent Application No. 201611249792.1, filed on Dec. 29, 2016, the contents of which are incorporated herein by reference.

TECHNICAL FIELD

This disclosure generally relates to machine learning, and more particularly, relates to systems and methods for detecting objects in images.

BACKGROUND

With the devolvement of video monitoring technology, intelligent video monitoring may be applied in more and more scenarios such as traffic, malls, hospitals, communities, parks, or the like, and the application of the intelligent video monitoring may lay a foundation for object detection in images in various scenarios.

Region Convolutional Neural Network (R-CNN) or its extension Fast R-CNN and Faster R-CNN may be commonly used to perform object detection in an image. FIG. 1 is a schematic diagram illustrating a process for detecting an object using the R-CNN method. The detection process may include receiving input images, extracting region proposals in the images, calculating a CNN feature of each region proposal, and determining a category and position of the object using classification and regression methods. In the above process, 2000 region proposals may be extracted from the images. The whole extraction process may take 1 to 2 seconds. Then the CNN feature may be calculated for each region proposal. Many overlaps may exist in the region proposals, thus there may be a lot of repetitive work during the CNN feature calculation. The detection process may include subsequent steps including proposal feature learning, position correction of the detected object, false detection elimination, etc. The whole detection process may need 2 to 40 seconds, which may significantly influence the efficiency of the object detection.

In addition, during the object detection using the R-CNN method, selective search may be used to perform image extraction. Then a convolutional neural network may be used to calculate CNN features. Finally, a support vector machine model (SVM) may be used to perform classification, and the position of the object may be determined. However, the three steps set forth above may be independent of each other, and the whole detection process cannot be holistically optimized.

FIG. 2 is a schematic diagram illustrating a process for detecting an object using the Faster RCNN method. The process may be performed by using a convolutional neural network. A sliding window 210 may generate 256 dimensional data in an intermediate layer 220. The category of the object may be detected in a classification layer 230 and the position of the object may be detected in a regression layer 240. Category detection and position detection of the object may be performed in two independent steps. Detection for the 256 dimensional data in the intermediate layer 220 may be required in both the two steps. Thus the above process may increase the detection time, and the efficiency of the object detection may be influenced.

SUMMARY

In an aspect of the present disclosure, an image processing system is provided. The image processing system configured to detect objects in images comprises a bus; at least one storage medium connected to the bus, including a set of instructions for object detection; and logic circuits in communication with the at least one storage medium via the bus, wherein when executing the set of instructions, the logic circuits may obtain first electronic signals including an image including an object; generate one or more feature vectors related to the image based on a first convolutional neural network, wherein the one or more feature vectors including a plurality of parameters; determine a position of the object based on at least one of the plurality of parameters; and determine a category associated with the object based on at least one of the plurality of parameters.

In some embodiments, the plurality of parameters may include position parameters and category parameters, the position of the object is determined based on at least one of the position parameters, and the category associated with the object is determined based on at least one of the category parameters.

In some embodiments, the logic circuits may further select one or more region proposals in the image, wherein each region proposal includes an object, each region proposal corresponding to a feature vector In some embodiments, to obtain the first neutral network, the logic circuits may obtain a sample image including one or more target objects; enclose the one or more target objects in one or more rectangular boxes; generate one or more first training feature vectors corresponding to the one or more rectangular boxes; and train the first convolutional neural network based on the sample image including the one or more first training feature vectors.

In some embodiments, the position parameters of a feature vector of the one or more feature vectors may include position information and outline dimension parameters of the region proposal, and the position information of the region proposal may be determined based on a position of a reference point related to a rectangular box in which the object is enclosed.

In some embodiments, the reference point may include at least one of a vertex of the rectangular box or a center point of the rectangular box.

In some embodiments, the first convolutional neural network may include two fully connected convolutional layers being connected in parallel, the two fully connected convolutional layers configured to identify the region proposals in the image.

In some embodiments, the logic circuits may further divide the image into a plurality of regions, each of the plurality of grids corresponding to a feature vector.

In some embodiments, to obtain the first convolution neural network, the logic circuits may obtain a sample image including one or more target objects; enclose the one or more target objects in one or more rectangular boxes; divide the sample image into a plurality of regions; generate one or more second training feature vectors corresponding to the plurality of regions; and train the first convolutional neural network based on the sample image including the one or more second training feature vectors.

In some embodiments, the logic circuits may normalize the image to the predetermined size in response to a determination that the image has a size different from a predetermined size.

In some embodiments, a first category parameter of the plurality of category parameters may represent a probability that the object belongs to a first category represented by the first category parameter, and the logic circuits may further determine that the object belongs to the first category when a value of the first category parameter is larger than a first value.

In some embodiments, the logic circuits may further determine that the object includes a predetermined scene; and obtain a first feature of the object in the image based on a second convolutional neural network.

In some embodiments, the predetermined scene may include a person close to a window of a vehicle; and the first feature may include whether the person is fastened with a seat belt.

In another aspect of the present disclosure, an image processing method is provided. The method configured to implemented on at least one image processing device to detect objects in images comprises obtaining, by the at least one image processing device, an image including an object; generating, by the at least one image processing device, one or more feature vectors related to the image based on a first convolutional neural network, wherein the one or more feature vectors includes a plurality of parameters; determining, by the at least one image processing device, a position of the object based on at least one of the plurality of parameters; and determining, by the at least one image processing device, a category associated with the object based on at least one the plurality of parameters.

In a further aspect of the present disclosure, a non-transitory medium storing instructions is provided. The instructions, when executed by at least one image processing device, causing the at least one image processing device to implement a method, comprises obtaining, by the at least one image processing device, an image including an object; generating, by the at least one image processing device, one or more feature vectors related to the image based on a first convolutional neural network, wherein the one or more feature vectors includes a plurality of parameters; determining, by the at least one image processing device, a position of the object based on at least one of the plurality of parameters; and determining, by the at least one image processing device, a category associated with the object based on at least one the plurality of parameters.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 3D is a schematic diagram illustrating an exemplary process for detecting an object in an image according to some embodiments of the present invention;

DETAILED DESCRIPTION

Figure 1:
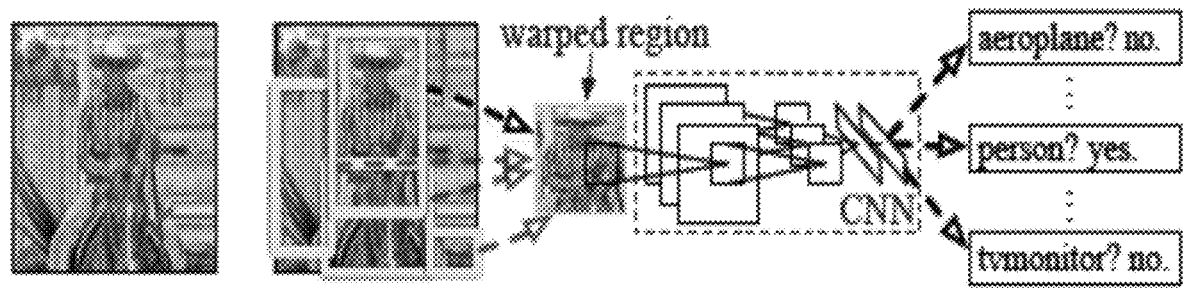
FIG. 1 is a schematic diagram illustrating a process for detecting object using R-CNN method.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

In order to improve efficiency and instantaneity of the object detection, and facilitate holistic optimization of the object detection, a system and method for detecting an object in an image may be set forth in the following embodiments of the present disclosure. According to the present disclosure, a convolutional neutral network may detect an object in an image by processing the image through a plurality of layers therein. During this process, the object may be extracted, then a feature vector corresponding to the object may be determined. The feature vector may be used to identify category and position information of the object. The whole process may be optimized by training the convolutional neutral network, thus the efficiency of the object detection may be improved.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In an aspect, the present disclosure is directed to systems and methods for detecting objects in images. An image processing device may divide an image into a plurality of segments (e.g., region proposals or grids), and determine a feature vector for each segment based on a convolutional neural network. The feature vector may include a plurality of position parameters and category parameters. The image processing device may determine the position and the type of an object in the image based on the position parameters and category parameters respectively. The image processing set forth above may need a huge amount of calculations (e.g., hundreds or thousands of millions calculations per second), which cannot be achieved by manual computations without machines.

Figure 3A:
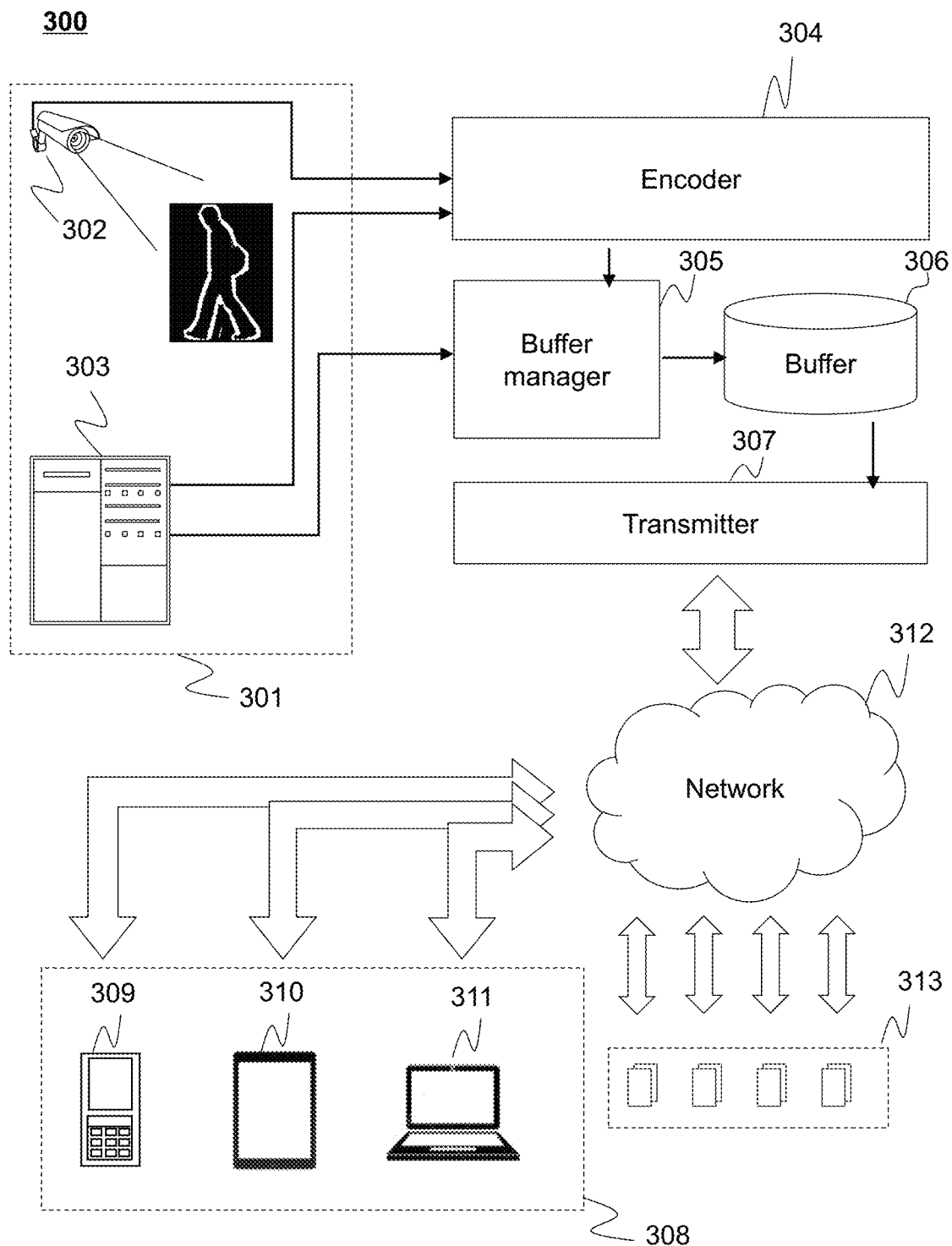
FIG. 3A is a schematic diagram illustrating an exemplary object detection system according to some embodiments of the present disclosure.

FIG. 3A is a schematic diagram illustrating an exemplary object detection system according to some embodiments of the present disclosure. As shown, the object detection system 300 may include a video source 301, an encoder 304, a buffer manager 305, a buffer 306, a transmitter 307, a terminal 308 (or a plurality of terminals 308), network 312, and a network storage device 313 (or a plurality of network storages 313).

The video source 301 may provide a video through the network 312 to a user of a terminal 308. The video source 301 may generate a video itself or a video transfer site. The video source 301 may include a camera 302 and/or a media server 303. The media sever may be a server (e.g., a computer or a group of computers) for storing, broadcasting, selling, renting, or providing videos. The media server may also include an image and/or video processing electronic device (not shown) configured to process the images and/or video streams from the video source 301 using the methods introduced in the present disclosure.

A "video" provided by the video source 301 may be an electronic medium (e.g., a data file, a bit stream, a series of signal) for the recording, copying, playback, broadcasting, and display of moving visual media, such as a TV program, an animation, a movie, a surveillance or monitoring video, a video shared through a social platform, an advertisement, a live show, a video call, a video conference, or the like, or a combination thereof. A video may include a plurality of frames, which may also be referred to as video frames. A frame may be one of a plurality of still images that compose a completer video. By sequentially displaying frames (e.g., images) of a video in a rate (frame rate), a video player installed on the terminal 308 may present the video to a user.

Before transmitting a video through the network 312, the video source 301 may send the video to the encoder 304 for encoding the video, or send the video to the buffer 306 through the buffer manager 305. For example, the video provided by the video source 301 may be relatively large in size (e.g., raw video data, video encoded with low compression rate), thus before the transmission the video source 301 may send the video to the encoder 304 for video compression. As another example, the video provided by the video source 301 may be proper in size, and the video source 301 may directly send the video to the buffer 306 through the buffer manager 305 for video transmission.

An encoder 304 may encode the video provided by the video source 301 before the video is transmitted through the network 312. Through encoding, the video to be transmitted may be compressed and/or encrypted. For example, the encoder 304 may encode a video using an algorithm for video compression so that the cost (e.g., time cost, resource cost, financial cost) for transmitting the video may be significantly reduced. Alternatively or additionally, the encoder 304 may encode a video using an algorithm for video encryption so that the video may be transmitted safely and a user without permission may not watch the video. The encoder 304 may encode the video frame by frame and generate a plurality of encoded video frames. The encoder 304 may send the encoded video frame to the buffer 306 through the buffer manager 305. Alternatively or additionally, the buffer manager 305 may obtain the encoded video frame from the encoder 304.

In some embodiments, the encoder 304 may encode the video to be transmitted using a Moving Picture Experts Group (MPEG) based encoding technique.

The video frames and/or images to be transmitted may be stored in the buffer 306 in a form of a video frame buffering queue, which may be managed by the buffer manager 305.

The buffer 306 may use a queue based data structure for buffering the video to be transmitted.

The buffer 306 may be a storage device for buffering the video to be transmitted through the network 312. The buffer 306 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM), such as a dynamic RAM (DRAM), a double date rate synchronous dynamic RAM (DDR SDRAM), a static RAM (SRAM), a thyristor RAM (T-RAM), and a zero-capacitor RAM (Z-RAM). Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The transmitter 307 may transmit the video or video frames buffered in the buffer 306 to the network 312. The transmitter 307 may transmit video or video frames in response to instructions sent from the video provider 301, the buffer manager 305, the terminal 308, or the like, or a combination thereof. Alternatively or additionally, the transmitter 307 may spontaneously transmit video or video frames stored in the buffer 306. The transmitter 307 may transmit video or video frames through the network 312 to the terminal 308 though one or more network connections (wired and/or wireless).

In some embodiments, the transmitter 307 may be capable of determine the transmission performance of the network 312. For example, the transmitter 307 may monitor its data transmitted rate for determining the transmission performance.

The terminal 308 may receive the transmitted video through the network 312. The terminal 308 may decode (e.g., through a video player installed on the terminal 308) the transmitted video or video frames using a decoding algorithm and display the video to a user. The decoding algorithm may correspond to the encoding algorithm used by the encoder 304.

The terminal 308 may be various in forms. For example, the terminal 308 may include a mobile device 309, a tablet computer 310, a laptop computer 311, or the like, or any combination thereof. In some embodiments, the mobile device 309 may include, a wearable device, a mobile device, a virtual reality device, an augmented reality device, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™ a Gear VR™, etc. In some embodiments, the terminal(s) 308 may be part of a processing engine.

The network 312 may include any suitable network that can facilitate a transmission of a video provided by the video source 301 to the terminal(s) 308. The network 312 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 312 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 312 may include one or more network access points. For example, the network 312 may include wired and/or wireless network access points such as base stations and/or internet exchange points through which a video provided by the video source 301 may be transmitted to the terminal 308.

In some embodiments, the network 312 may include one or more network storage devices 313. The network storage device 313 may be a device for buffering or caching data transmitted in the network 312. The video or video frame transmitted by the transmitter 307 may be buffered or cashed in one or more network storage devices 313 before being received by the terminal 308. The network storage device 313 may be a server, a hub, a gateway, or the like, or a combination thereof.

It may be noted that, one or more of the encoder 304, buffer manager 305, buffer 306 and transmitter may be a stand-alone device, or a module integrated into another stand-alone device. For example, one or more of the encoder 304, buffer manager 305, buffer 306 and transmitter 307 may be integrated into the camera 302 or the media server 303. As another example, the encoder 304, buffer manager 305, buffer 306 and transmitter 307 may be included in a video processing engine which may communicate with the video source 301 through direct wired connection, the network 312, or another network not shown in FIG. 3A. As a further example, the encoder 304 may be a stand-alone device (e.g., a computer or a server), while the buffer manager 305, buffer 306 and transmitter 307 may be included in another stand-alone device.

Figure 2:
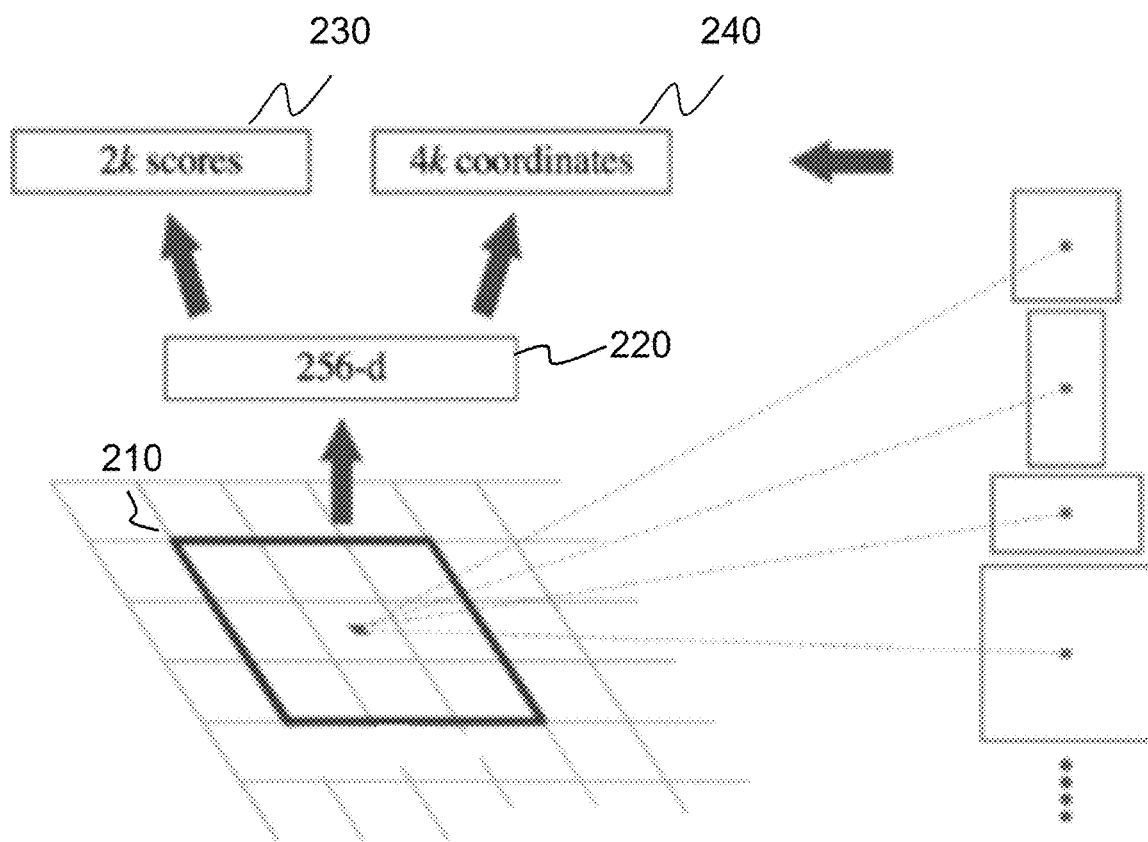
FIG. 2 is a schematic diagram illustrating a process for detecting object using Faster RCNN method.
Figure 3B:
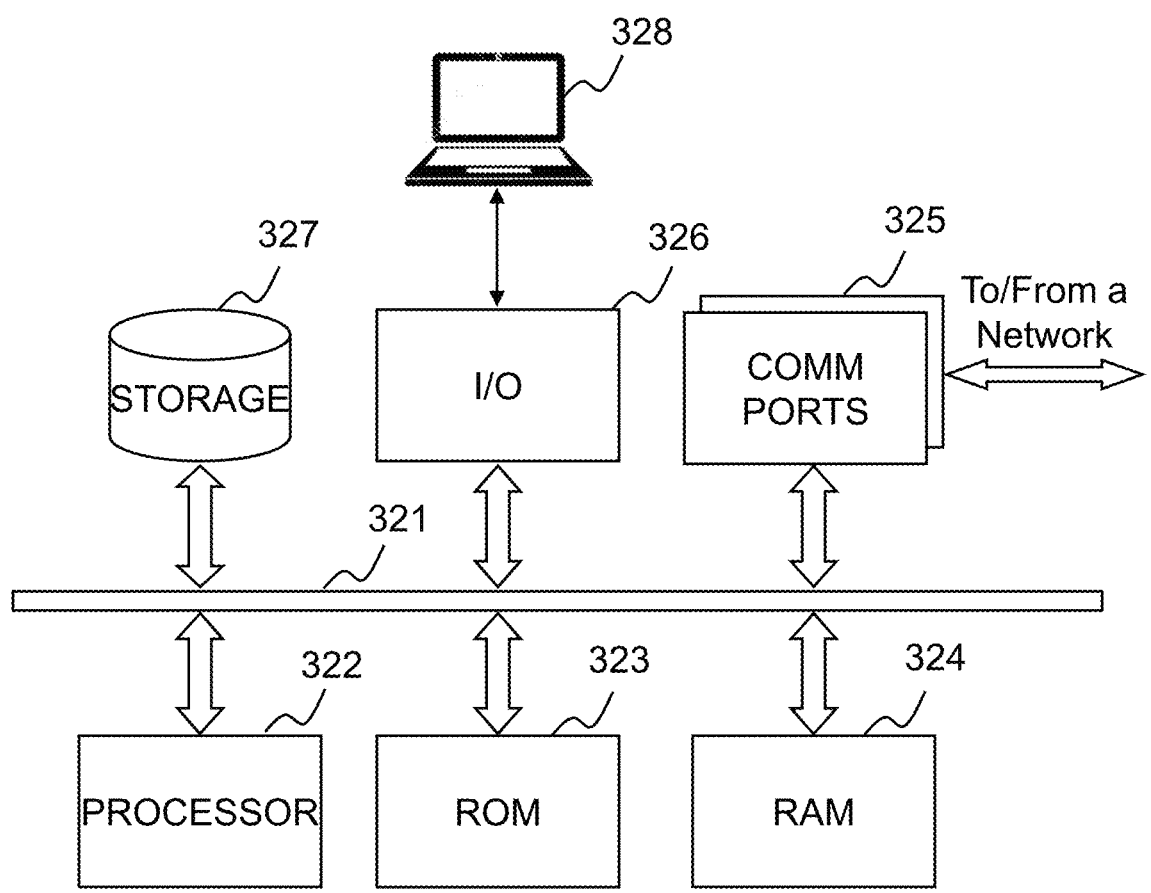
FIG. 3B is a schematic diagram illustrating exemplary components of an exemplary computing device according to some embodiments of the present disclosure.

FIG. 2 is a schematic diagram illustrating exemplary hardware and/or software components of an exemplary computing device according to some embodiments of the present disclosure. For example, the computing device 320 may be the server 303, and/or an electronic device specialized in video or image processing. The encoder 304 and buffer manager 305 may also be implemented on computing device 320. As illustrated in FIG. 3B, the computing device 320 may include a processor 322, a storage 327, an input/output (I/O) 326, and a communication port 325.

The processor 322 (e.g., logic circuits) may execute computer instructions (e.g., program code) and perform functions in accordance with techniques described herein. For example, the processor 322 may include interface circuits and processing circuits therein. The interface circuits may be configured to receive electronic signals from a bus (not shown in FIG. 3B), wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. In some embodiments, the processor 322 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 320. However, it should be noted that the computing device 320 in the present disclosure may also include multiple processors, thus operations and/or method steps that are performed by one processor as described in the present disclosure may also be jointly or separately performed by the multiple processors. For example, if in the present disclosure the processor of the computing device 320 executes both step A and step B, it should be understood that step A and step B may also be performed by two or more different processors jointly or separately in the computing device 320 (e.g., a first processor executes step A and a second processor executes step B, or the first and second processors jointly execute steps A and B).

The storage 327 may store data/information obtained from the video source 301, the encoder 304, the buffer manager 305, the buffer 306, the transmitter 307, the terminal 308, the network 312, the network storage device 313, and/or any other component of the object detection system 300. In some embodiments, the storage 322 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 322 may store one or more programs and/or instructions to perform exemplary methods described in the present disclosure. For example, the storage 322 may store a program for the processing engine (e.g., the server 303) for determining a regularization item.

The I/O 327 may input and/or output signals, data, information, etc. In some embodiments, the I/O 327 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 325 may be connected to a network (e.g., the network 312) to facilitate data communications. The communication port 325 may establish connections between the video source 301, the encoder 304, the buffer manager 305, the buffer 306, the transmitter 307, the terminal 308, the network 312, the network storage device 313, and/or any other component of the object detection system 300. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 2400 may be and/or include a standardized communication port, such as RS232, RS485, etc. In some embodiments, the communication port 325 may be a specially designed communication port.

Figure 3C:
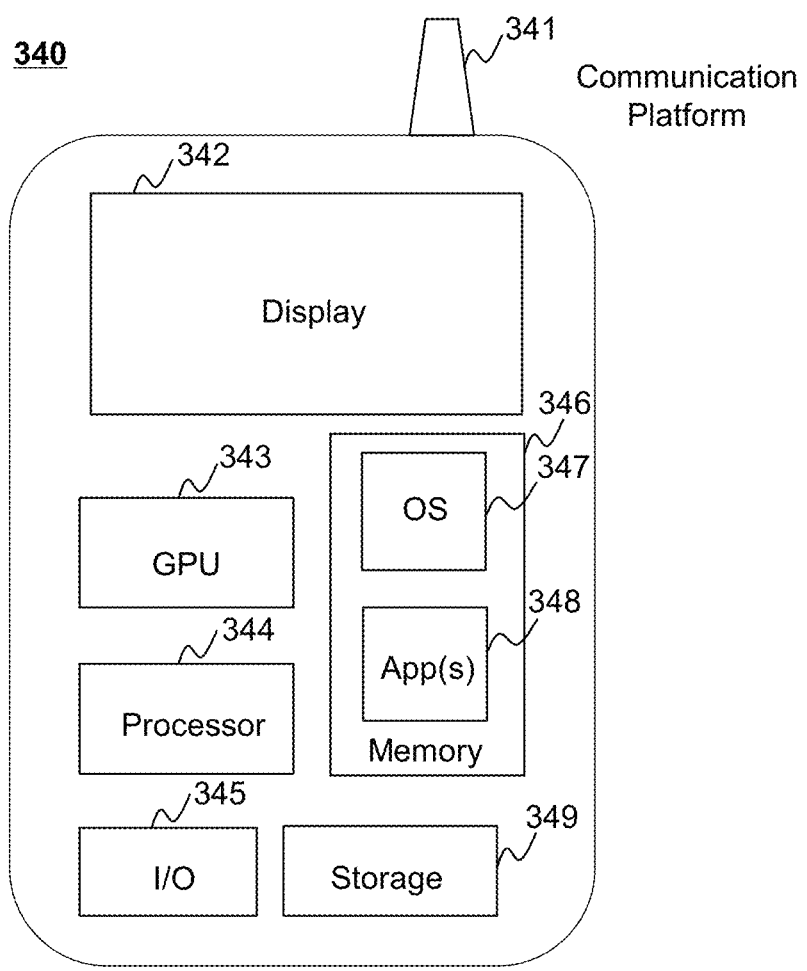
FIG. 3C is a schematic diagram illustrating exemplary components of an exemplary user device according to some embodiments of the present disclosure.

FIG. 3C is a schematic diagram illustrating exemplary components of an exemplary user device according to some embodiments of the present disclosure. As illustrated in FIG. 3C, the user device 340 may include a communication platform 341, a display 342, a graphic processing unit (GPU) 343, a processor 344, an I/O port 345, a memory 346, and storage 349. In some embodiments, any other suitable component, including but not limited to a system bus or a controller (not shown), may also be included in the mobile device 3000. In some embodiments, a mobile operating system 347 (e.g., iOS™, Android™, Windows Phone™) and one or more applications 348 may be loaded into the memory 346 from the storage 349 in order to be executed by the processor 344. The user device 340 may be an embodiment of the terminal 308. The applications 348 may include a video player for receiving a video provided by the video source 301 through the network 312 and decode the received video.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

FIG. 3D is a schematic diagram illustrating an exemplary process 360 for detecting an object in an image according to some embodiments of the present invention. The process may be executed by an image processing electronic device, such as the server 303 and/or the user device 340. For example, the process may be implemented as a set of instructions stored in the image processing electronic device. The image processing electronic device (e.g., a processor, logic circuits, and/or modules thereof) may execute the set of instructions and may accordingly be directed to perform the process.

In 361, an image may be input into a convolutional neural network, and one or more feature vectors corresponding to one or more region proposals in the image may be determined. The image may be obtained from an electronic device including, for example, a camera, a video recoder, or a storage capable of storing data. In some embodiments, one or more objects, such as a person, a vehicle, an animal, may be included in the image. The image may be input into a convolutional neural network. The convolutional neural network may facilitate feature extraction in the image. In some embodiments, the convolutional neural network may include a plurality of layers. The plurality of layers may include, for example, an input layer, an output layer, a convolutional layer, a pooling layer, a fully connected layer, a loss layer, or the like, or a combination thereof. After inputting the image into a convolutional neural network, a region proposal may be identified in the convolutional neural network. As used herein, the region proposal may refer to a region in the image with an object therein. In some embodiments, the region proposal may also be referred to as a candidate region. One or more layers, for example, two fully connected layers, which are connected in parallel, may identify a region proposal in the image. The one or more layers may perform a plurality of processing operations on the region proposal. For example, the plurality of processing operations may include adaptive down-sampling, subsampling, fully connected calculation, convolution, etc. A feature vector corresponding to each region proposal may be determined by performing the plurality of processing operations. The feature vector may include a plurality of parameters representing different features of the region proposal. Merely by ways of example, the parameters may include position parameters and category parameters.

The one or more processes in the present disclosure, for example, the process 360, may be executed by an electronic device. For example, the process 360 may be implemented as a set of instructions stored in the electronic device. The electronic device (e.g., a processor thereof) may execute the set of instructions and may accordingly be directed to perform the process 360. The electronic device may include a desktop, a note-book, or any other intelligent devices with processing capacity. In addition, the object detection technique described in the present disclosure may be used to detect an object in images in different traffic scenarios, and may also be used to detect an object in video monitoring in other scenarios, for example for surveillance of parks, apartments, supermarkets, or the like.

When performing object detection, the image may be input into the convolutional neural network. In some embodiments, the convolutional neural network may be trained before the object detection process is started. For example, the convolutional neural network may be trained according to the method described in FIG. 7. A structure of the convolutional neural network used in the process 300 may be illustrated in FIG. 6B. The convolutional neural network may include a plurality of layers. Merely for illustration purposes, the plurality of processing layers may include multiple pairs of convolutional layers and down-sampling layers (e.g., including a convolutional layer 631 and a down-sampling layer 632), and a single convolutional layer 633. As illustrated in FIG. 6B, the single convolutional layer 633 may be in serial connection with a region proposal selection module 634. The single convolutional layer 633 further connect with a adaptive down-sampling layer 635 and a fully connected layer 636. The region proposal selection module 634 may identify region proposals in feature maps obtained in the convolutional layers. The adaptive down-sampling layers may perform adaptive down-sampling for each identified region proposal. Then the fully connected layer may determine a feature vector corresponding to each region proposal based on the result of the adaptive down-sampling.

The feature vector may include a plurality of parameters of the region proposal, for example, position parameters and category parameters. The position parameters may relate to the position of a bounding box in which the object may be located. In some embodiments, a pre-set point related to the bounding box may be specified to determine the position of the bounding box. More particularly, the position parameters may include the position of the pre-set point related to the bounding box and outline dimension parameters of the bounding box. In some embodiments, the bounding box may be a rectangular box. The pre-set point in the bounding box may be any one of the four apices of the rectangular box or the center of the rectangular box. The outline dimension parameters of the bounding box may refer to the height and width of the rectangular box. For example, the feature vector corresponding to the region proposal may be expressed as (x, y, w, h, cls1, cls2, cls3, . . . , clsn), where x, y, w, and h may refer to position parameters, x and y may denote the position information of the pre-set point (also referred to as "the position of the pre-set point") related to the rectangular box, w and h may denote the outline dimension parameters of the rectangular box, w may denote the width of the rectangular box, h may denote the height of the rectangular box, and cls1, cls2, cls3, . . . , clsn may denote category parameters.

In 320, category and position of the object in the image may be determined based on the feature vector. A maximum value of a parameter in the category parameters in the feature vector corresponding to the region proposal may be identified. A determination so as to whether the maximum value of the parameter is larger than a threshold may be made. If the maximum value being larger than the threshold, the object in the region proposal may be determined as belonging to a certain category represented by the category parameter with the maximum value. The threshold may be preset by a user (e.g., a technician). The position of the object may be determined according to the position parameters of the feature vector.

In some embodiments, the value of each category parameter in the feature vector may represent a probability that the object in the region proposal belongs to a certain category. To be specific, the probability may be determined based on the matching score obtained by comparing the object with each category represented by each category parameter in the feature vector. Thus the maximum value of the category parameters in a feature vector may indicate a most possible category to which the object in the region proposal belonging. If the maximum value is greater than a pre-set threshold, the object included in the region proposal may be determined to belong to a category corresponding to the category parameter with the maximum value. For example, in the above feature vector (x, y, w, h, cls1, cls2, cls3, . . . , clsn), the value of cls3 is 0.7, which is the maximum value among the values of category parameters cls1 through clsn. If the pre-set threshold is 0.4, the category represented by cls3 may be determined as the category that the object in the region proposal belongs to. More particularly, if cls3 represents a bicycle, the object in the region proposals may be a bicycle.

In some embodiments, the convolutional neural network may be used to identify position information as well as category information of an object (also referred to as "category of an object") in the image. There is no need to use other methods. Thus the convolutional neural network may facilitate the holistic optimization of an object detection process. Moreover, during the detection, a region proposal may be determined, and the feature vector corresponding to the region proposal may be calculated accordingly. The category and position of an object in the region proposal may be identified based on the feature vector. There are no repetitive operations, thereby improving the efficiency of the detection. It should be noted that the above descriptions of the process 300 are provided for the purposes of illustration, and not intended to limit the scope of the present disclosure. For persons having ordinary skills in the art, various modifications and changes in the forms and details of the application of the above method and system may occur without departing from the principles in the present disclosure. However, those variations and modifications also fall within the scope of the present disclosure. For example, there may be a plurality of objects in the image, and a plurality of region proposals and feature vectors may be determined accordingly.

Figure 4:
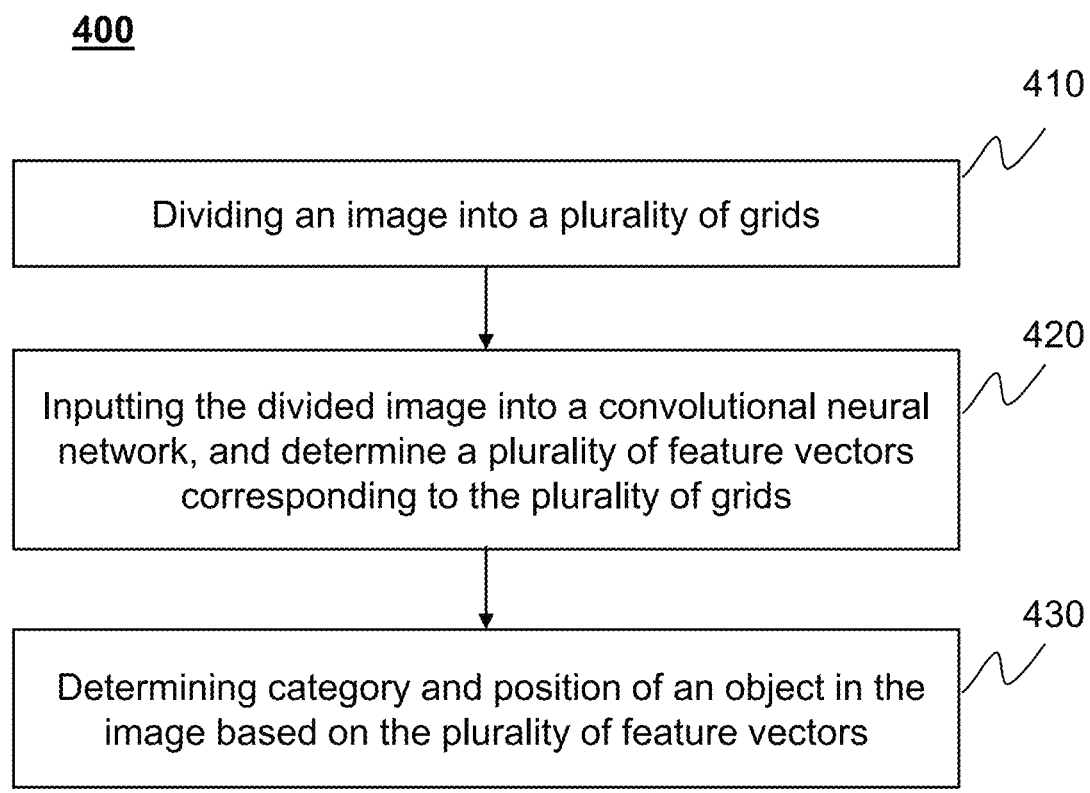
FIG. 4 is a flow chart illustrating an exemplary process for detecting an object in an image according to some embodiments of the present disclosure.

FIG. 4 is a flow chart illustrating an exemplary process 400 for detecting an object in an image according to some embodiments of the present disclosure. The process 400 may be executed by an image processing electronic device, such as the server 303 and/or the user device 340. For example, the process 400 may be implemented as a set of instructions stored in the image processing electronic device. The image processing electronic device (e.g., a processor, logic circuits, and/or modules thereof) may execute the set of instructions and may accordingly be directed to perform the process 400.

In 410, an image may be divided into a plurality of grids (e.g., regions). For example, the image processing electronic device may divide the image into a plurality of regions. In some embodiments, the image may include one or more objects, such as a person, a vehicle, an animal. The image may have a certain size, for example, 512×512, 1024×768. In some embodiments, the image may have a target size. The target size may be determined, for example, to meet the requirement of a convolutional neutral network.

After acquiring an image of a target size, the image processing device may divide the image into a plurality of grids in a predetermined manner. In some embodiments, the image may be divided into a plurality of grids in forms of multiple rows and columns (i.e., using the grids, the image processing device may divide the image into a plurality of rectangular regions). For example, the image may be divided into multiple rows and columns with a plurality of transverse lines and vertical line. The distances between adjacent transverse lines or adjacent vertical lines may be same or different. In some embodiments, the image may be divided into multiple irregular grids. For example, the image may be divided into a plurality of grids according to the profile of the one or more objects therein. In some embodiments, the predetermined manner for dividing the image into grids may be same as or similar to the manner in which the sample images are divided during the training process of the convolutional neural network. Details regarding the training process of the convolutional neural network may be described elsewhere in the present disclosure, for example, FIGS. 8-9 and the descriptions thereof.

When dividing the image into multiple grids including multiple rows and columns, the number of rows and columns may be same. Alternatively, the number of rows and columns may be different. The length-to-width ratios of grids may be same or different.

In 420, the divided image may be input into a convolutional neural network, and a plurality of feature vectors corresponding to the plurality of grids may be determined. Similar to the embodiment disclosed in FIG. 3D, the divided image may be input into a convolutional neutral network and a plurality of feature vectors of the image may be output from the convolutional neural network. In some embodiments, a feature vector may correspond to a grid in the image.

Figure 8:
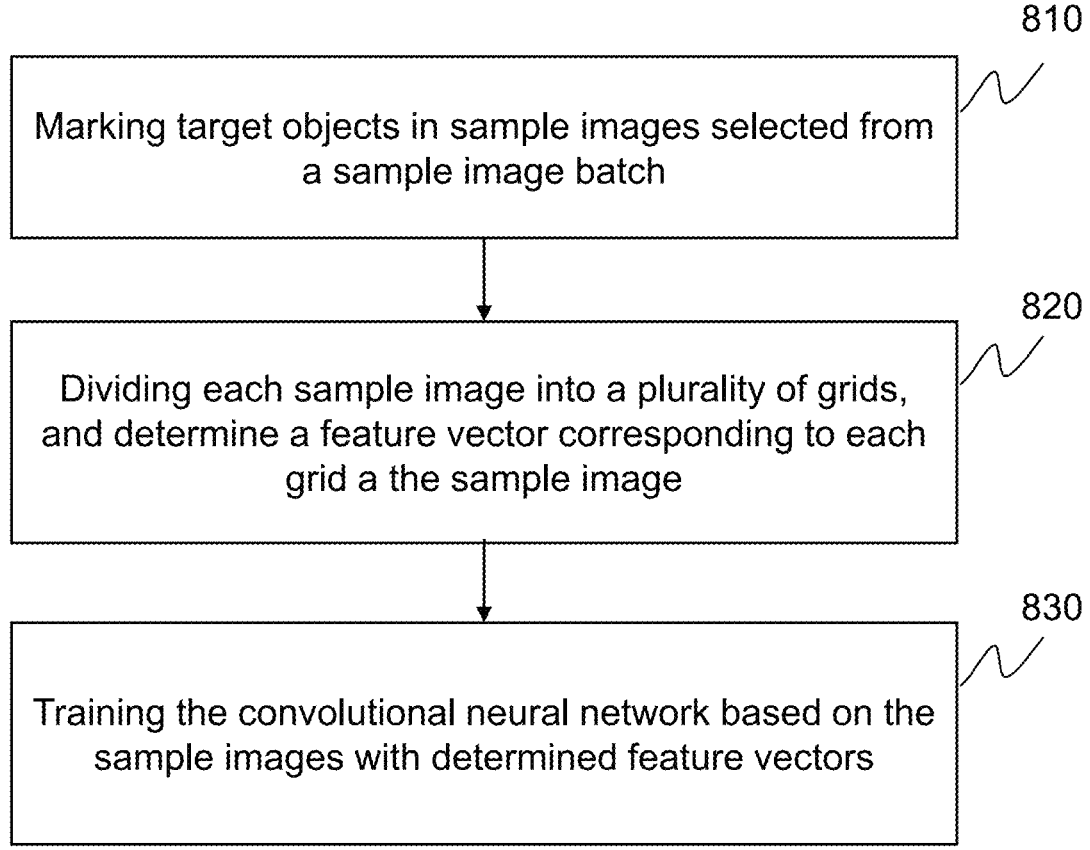
FIG. 8 is a flow chart illustrating an exemplary training process of the convolutional neural network according to some embodiments of the present disclosure.

In some embodiments, the convolutional neural network may be trained, for example, according to the method described in FIG. 8, before the object detection process is started. The trained convolutional neural network may output a plurality of feature vectors after receiving an input image. Each feature vector may correspond to a grid in the image. For example, the image may be divided into 49 grids of 7×7 (i.e., 7 rows×7 columns). The 49 feature vectors may be output after inputting the divided image into the trained convolutional neural network, and each feature vector may correspond to a grid.

In 430, category and position of the object in the image may be determined based on the plurality of feature vectors. In some embodiments, the category and position of the object in the image may be determined in a manner which is similar to the embodiment illustrated in 320 of FIG. 3D. More particularly, a maximum value of the category parameters in the feature vector corresponding to each grid may be identified. A determination so as to whether the maximum value of the parameter is larger than a threshold may be made. If the maximum value being larger than the threshold, the object whose center in the grid may be determined as belonging to a certain category represented by the category parameter with the maximum value. The position of the object may be determined according to the position parameters in the feature vector corresponding to the grid. In some embodiments, the category and position of the object may be determined on the basis of determining the grid in which the center (also referred to as "center point") of the object is located.

More particularly, the feature vector obtained in the process 400 may be a multi-dimensional vector. The feature vector may include at least one or more category parameters and position parameters. The position parameters may further include position parameters of the center of the object and an outline dimension parameter. The pre-set point may refer to a reference point, for example, the central point of an object in the image. A determination as to whether an object is included in a grid may be made based on the category parameters of the feature vector. In some embodiments, a category parameter with the maximum value may be singled out from the multiple category parameters. If the maximum value of the category parameter is greater than a predetermined threshold, the category of the object may be determined. In some embodiments, a certain category represented by the category parameter may be determined as the category to which the object belongs. Then the position of the object may be determined based on the position parameters of the feature vector corresponding to the grid in the image.

In the training process of the convolutional neural network, the position parameters in the feature vector may be determined according to a predetermined method. The determination of the position parameters in the feature vector during the object detection process may be same as the determination of the position parameters during the training process.

The category and position of an object in the image may be determined based on category parameters and position parameter in a feature vector corresponding to a grid in which the center of the object is located. This may also realize the prediction for the position and category of the object in the meanwhile, and facilitate the holistic optimization of the object detection process. Besides, after determining a feature vector corresponding to each grid, the position and category of the object may be determined without further selecting a plurality of feature regions. Thus the detection time of the object detection process may be saved, and the instantaneity and efficiency of the detection process may be improved.

In some embodiments, the object detection may be performed on condition that the obtained image has a target size. The target size may be any suitable size. For example, the target size may be, 1024×1024, 256×512, or the like. In some embodiment, the image of the target size may be needed during both the training process of the convolutional neural network and the object detection process. A user may determine the target size, for example, according to default settings of a system for object detection.

In order to ensure that the image input into the convolutional neural network has a target size, a determination as to whether the image has the target size may be made before dividing the image into a plurality of grids. If the image doesn't have a target size, the image may be resized to the target size.

If the image has the target size, subsequent processing operations may be performed on the image directly. An image of a size other than the target size may be resized until it has the target size. The resizing of the image may be performed according to one or more image processing techniques, for example, digital zoom.

The position of an object may be determined based on the position parameters of the center point of the object (also referred to as "the center of the object") and the outline dimension parameters in the feature vector. The position of the center point relative to the grid may be determined based on the position parameters of the center point. More particular, a preset point may be specified to determine the position of the grid. The position of the center point relative to the grid may be determined based on the position parameters of the center point and the position of the preset point.

In some embodiments, the center point of the object may be determined as the center of a rectangular box enclosing the object. The position of the rectangular box may be determined based on the outline dimension parameters in the feature vector corresponding to the grid. In some embodiments, the position of the rectangular box may be determined as the position of the object.

Figure 5:
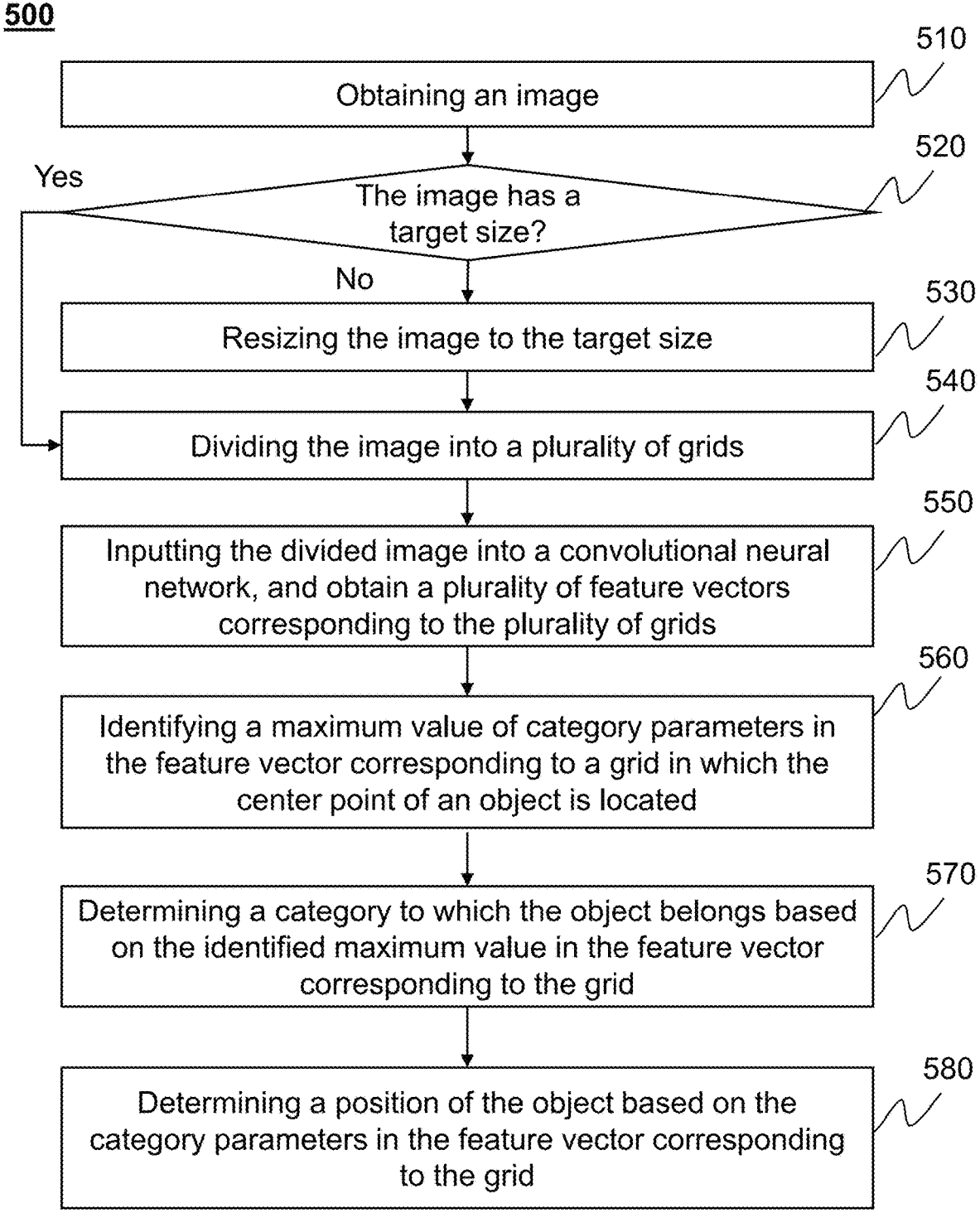
FIG. 5 is a flow chart illustrating an exemplary process for detecting an object in an image according to some embodiments of the present disclosure.

FIG. 5 is a flow chart illustrating an exemplary process 500 for detecting an object in an image according to some embodiments of the present disclosure. In some embodiments, the process 500 for detecting an object may summarize the detailed descriptions of the process 400. Accordingly, the process may be executed by the image processing electronic device, such as the server 303 and/or the user device 340. For example, the process may be implemented as a set of instructions stored in the image processing electronic device. The image processing electronic device (e.g., a processor, logic circuits, and/or modules thereof) may execute the set of instructions and may accordingly be directed to perform the process.

In 510, an image may be obtained. The image may be obtained from an electronic device, for example, a camera, a video recoder, a storage capable of storing data. In some embodiments, the image may include one or more objects therein, such as a person, a vehicle, an animal, etc.

In 520, a determination may be made as to whether the image has a target size. If the image has a target size, the process 500 may proceed to 540. If the image doesn't have a target size, the process 500 may proceed to 530 to resize the image to the target size. The target size may be specified by a user (e.g., a technician). The target size may be, for example, 1024×1024, 256×512, or the like. In some embodiments, the image of the target size may be needed during both the training process of the convolutional neural network and the object detection process.

In 530, the image may be resized to the target size. The image may be resized using one or more image processing techniques, for example, digital zoom.

In 540, the obtained image may be divided into a plurality of grids (e.g., a plurality of regions). In some embodiments, the image may be divided into a plurality of grids with regular shapes. For example, the image may be divided into a plurality of grids in forms of multiple rows and columns. In some embodiments, the image may be divided into multiple irregular grids. For example, the image may be divided into a plurality of grids according to the profile of an object in the image.

In 550, the divided image may be input into a convolutional neural network, and a plurality of feature vectors corresponding to the grids in the image may be output from the convolutional neural network. In some embodiments, the convolutional neural network may be trained before the object detection process is started. The trained convolutional neural network may output a plurality of feature vectors after receiving an input image. Each feature vector may correspond to a grid in the image.

In 560, a maximum value of each category parameter in a feature vector corresponding to a grid may be identified. In some embodiments, a grid may be identified. The identified grid may include the center point of an object in the image. The values of the category parameters in a feature vector corresponding to the grid may be determined. A maximum value of the values of the category parameters may be identified. The category parameter corresponding to the selected maximum value may be determined.

In 570, the category of the object may be determined based on the identified maximum value. A determination so as to whether the maximum value of the parameter is larger than a threshold may be made. If the maximum value being larger than the threshold, the object whose center in the grid may be determined as belonging to a certain category represented by the category parameter with the maximum value.

In 580, the position of the object may be determined. A pre-set point related to the grid may be determined as a reference point. The position of the center point of the target object relative to the grid may be determined. In some embodiments, the center point of the target object relative to the grid may be determined based on the reference point and the position parameters of the center point in the feature vector corresponding to each grid. The center point may be identified based on the position of itself. In some embodiments, the center point may be determined as the center of a bound box (e.g., a rectangular box) enclosing the object. The position of the rectangular box may be determined based on the outline dimension parameter. The position of the rectangular box may be determined as the position of the object.

The object detection process may be performed based on a trained convolutional neural network. In some embodiments, a sample image having a target size may be divided into a plurality of grids during the training process of the convolutional neural network. If the center point of an object is located in a certain grid, the grid may be used for detecting the object, including detecting the category and the position of the target object (or a bounding box enclosing the target object).

Figure 6A:
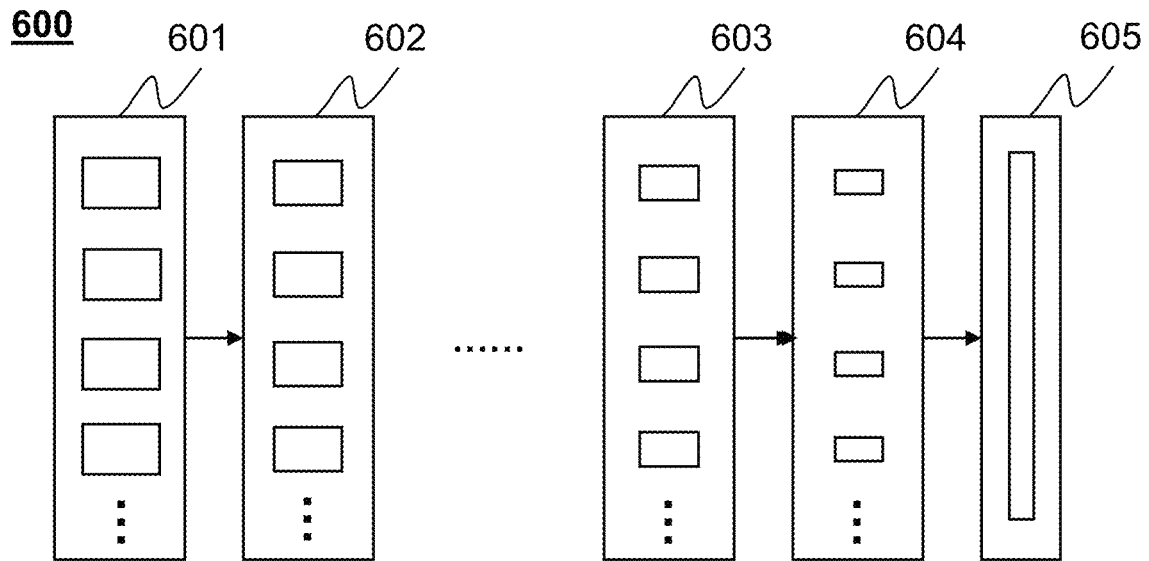
FIG. 6A is a structural diagram of a traditional convolutional neural network in prior art according to some embodiments of the present disclosure.
Figure 6B:
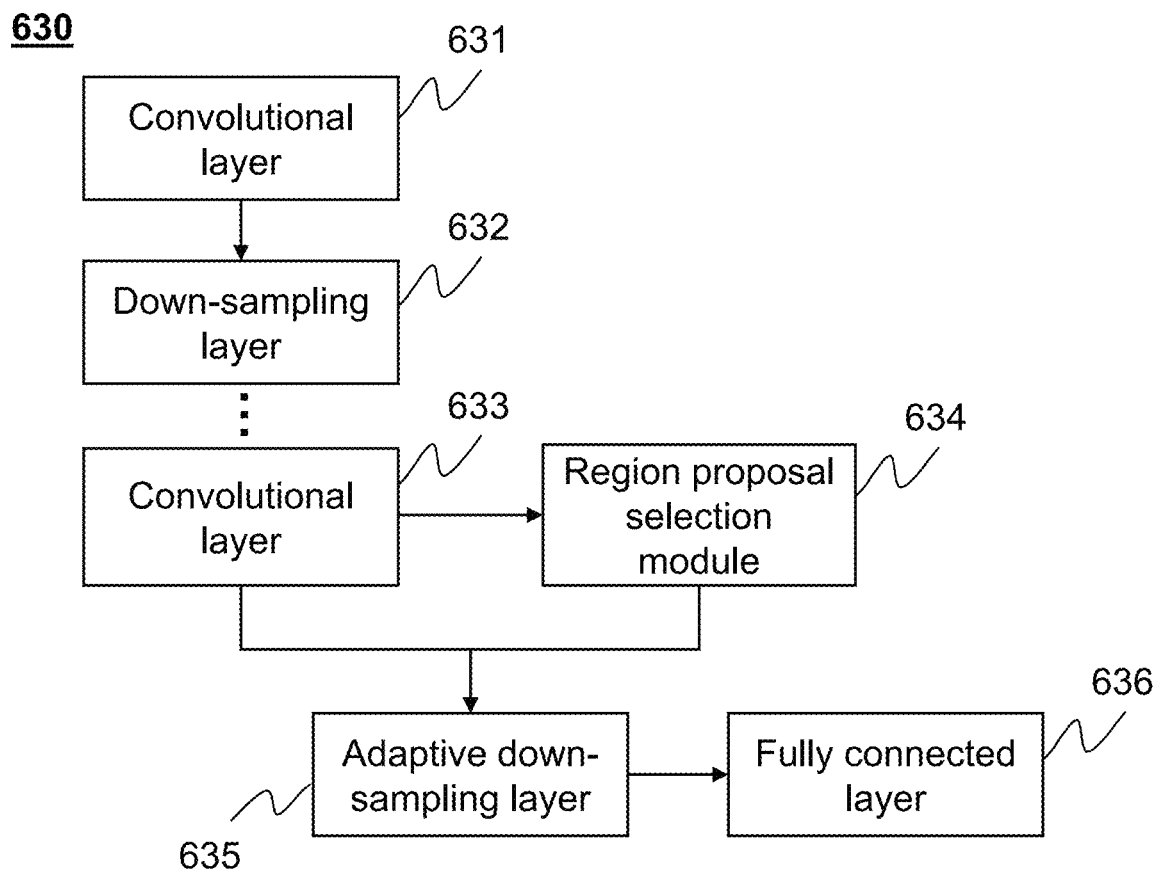
FIG. 6B is a schematic diagram illustrating the structure of the convolutional neural network according to some embodiments of the present disclosure.

FIG. 6A is a structural diagram of a traditional convolutional neural network in prior art according to some embodiments of the present disclosure. As illustrated in FIG. 6A, the convolutional neural network 600 may include multiple pairs of convolutional layers and down-sampling layers (e.g., convolutional layers 601 and 603, down-sampling layers 602 and 604), and a fully connected layer 605. The fully connected layer 605 may be coupled to the multiple pairs of convolutional layers by connecting the down-sampling layer 604 in the last pair. The convolutional neural network 600 may input an image in convolutional layers 601 and output detection results (e.g., a feature vector) from the fully connected layer 605. In some embodiments, the size of the fully connected layer 605 may be fixed. The image input into the convolutional neural network 600 may have a particular size corresponding to the size of the fully connected layer 605. If the size of the input image is different from the specified size, the convolutional neural network 600 may fail to detect the objects in the image.

In order to detect images of different sizes, a convolutional neural network may be provided according to some embodiments of the present disclosure. FIG. 6B is a schematic diagram illustrating the structure of the convolutional neural network. The convolutional neural network 630 may include one or more pairs of convolutional layers and down-sampling layers (e.g., convolutional layer 631 and down-sampling layer 632), a single convolutional layer 633, a region proposal selection module 634, an adaptive down-sampling layer 635 and a fully connected layer 636. The convolutional layer 633 may connect with the region proposal selection module 634. Details regarding the region proposal selection module may be described elsewhere in the present disclosure, for example, FIG. 6C and the descriptions thereof. Both the convolutional layer 633 and the region proposal selection module 634 may connect with the adaptive down-sampling layer 635. The adaptive down-sampling layer may further connect to the fully connected layer 636. The convolutional neural network 630 may input an image in the convolutional layers 631 and output detection results (e.g., a feature vector) from the fully connected layer 636.

Specifically, the region proposal selection module 634 may select a plurality of region proposals. Each of the plurality of region proposal may include an object. The region proposals may have different sizes. However, as is mentioned above, an image of a particular size may be need as the input of the fully connected layer 636. Thus the adaptive down-sampling layer 635, which may be connect the region proposal selection module 634 and the fully connected layer 636, may facilitate the adjustment of the size of the image. Merely for illustration purposes, the adaptive down-sampling layer 635 may perform adaptive down-sampling on region proposals in a convolutional feature map output by the convolutional layer 633. In some embodiments, the region proposals may have different sizes. The region proposals may be resized to a particular size, and then input into the fully connected layer 636 to determine a feature vector corresponding to each region proposal. Then the object detection may be realized.

Figure 6C:
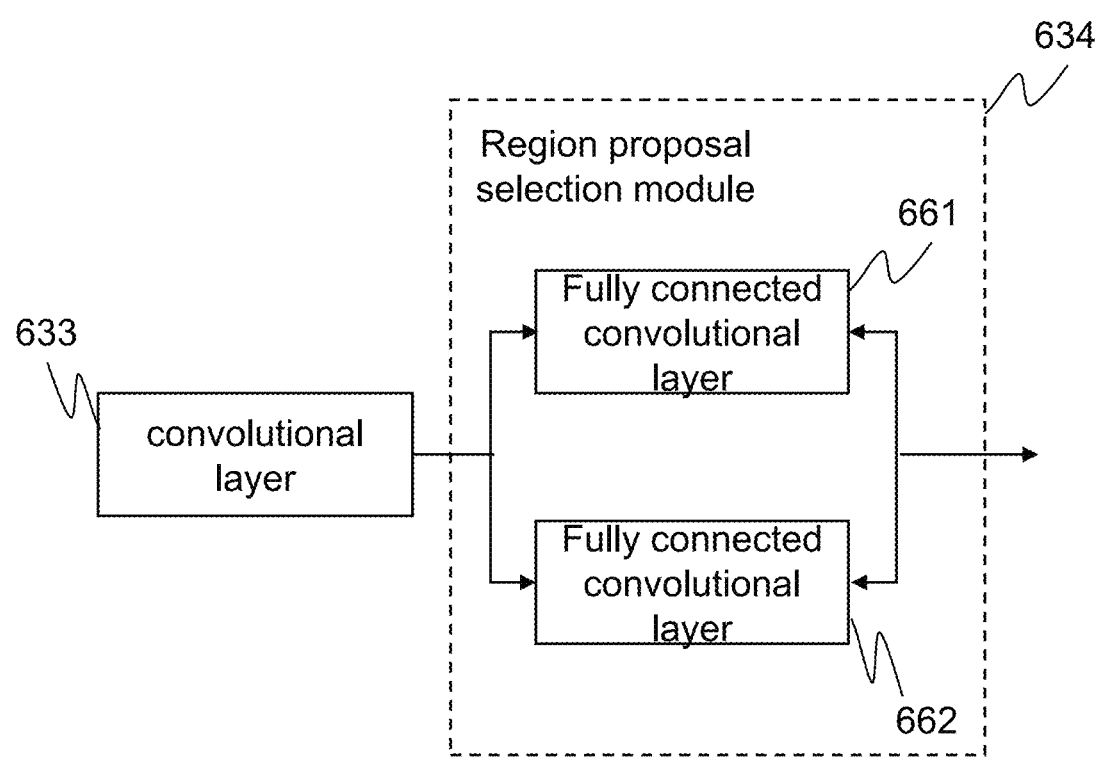
FIG. 6C is a schematic diagram of the region proposal selection module according to some embodiments of the present disclosure.

According to some embodiments of the present disclosure, a convolutional neural network may select region proposals in images, and objects may be detected in the selected region proposals in the images. In some embodiments, the region proposal selection module 634 illustrated in FIG. 6B may be another convolutional neural network. FIG. 6C is a schematic diagram of the region proposal selection module 634 according to some embodiments of the present disclosure. The region proposal selection module 634 may include two fully connected convolutional layers 661 and 662. In some embodiments, the two fully connected convolutional layers 661 and 662 may be connected to each other in parallel. The two fully connected convolutional layers 661 and 662 may connect with the convolutional layer 633 and the adaptive down-sampling layer 635 (not shown).

The convolutional layer 633 may determine a convolutional feature map. The two fully connected convolutional layers 661 and 662 may receive the convolutional feature map and select region proposals in the convolutional feature map. More particular, the two fully connected convolutional layers 661 and 662 may determine a category feature map and a region feature map, respectively based on the determined convolutional feature map. The category feature map may be used to determine the probability that an object may exist in a region. For example, the probability value that an object may exist in a region determined based on the category feature map may be 0 or 1. The probability value 0 may represent that there is no object exists in the region, and the probability value 1 may represent that there is an object exists in the region. In some embodiments, some other methods may be used to determine the probability that an object exists in a region. For example, a probability threshold may be set. If the probability is greater than the probability threshold, it may indicate that there is an object exists in the region. If the probability is smaller than the probability threshold, it may indicate that there is no object exists in the region.

The region feature map may be used to determine position of a region. And the category feature map may be used to determine a region proposal. To be specific, a region including an object may be identified. Each identified region may be determined as a region proposal. Position parameters of a region proposal may be determined based on the region feature map.

Figure 7:
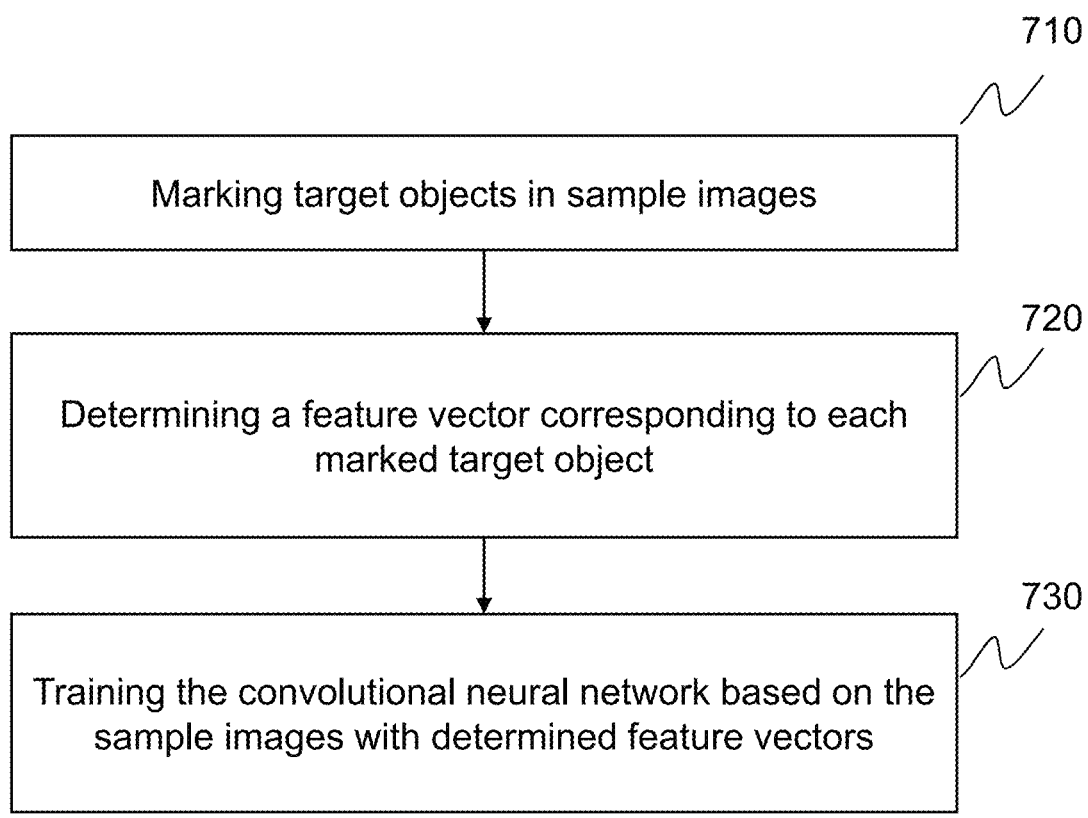
FIG. 7 is a flow chart illustrating an exemplary process for training a convolutional neural network according to some embodiments of the present disclosure.

FIG. 7 is a flow chart illustrating an exemplary process 700 for training a convolutional neural network according to some embodiments of the present disclosure. The process may be executed by an image processing electronic device, such as the server 303 and/or the user device 340. For example, the process may be implemented as a set of instructions stored in the image processing electronic device. The image processing electronic device (e.g., a processor, logic circuits, and/or modules thereof) may execute the set of instructions and may accordingly be directed to perform the process.

In 710, target objects in sample images may be marked. A target object in a sample image may be marked in a predetermined manner. For example, a target object may be marked with an arrow, a star, a triangle, a rectangular box, or the like, or a combination thereof. In some embodiment, a target object in a sample image may be marked by enclosing the target object in a rectangular box.

The sample images may be selected from a sample image batch to train the convolutional neural network. In some embodiments, the sample image batch may include a plurality of sample images including different objects (e.g., vehicles, animals, buildings, fruits, or the like).

Figure 9A:
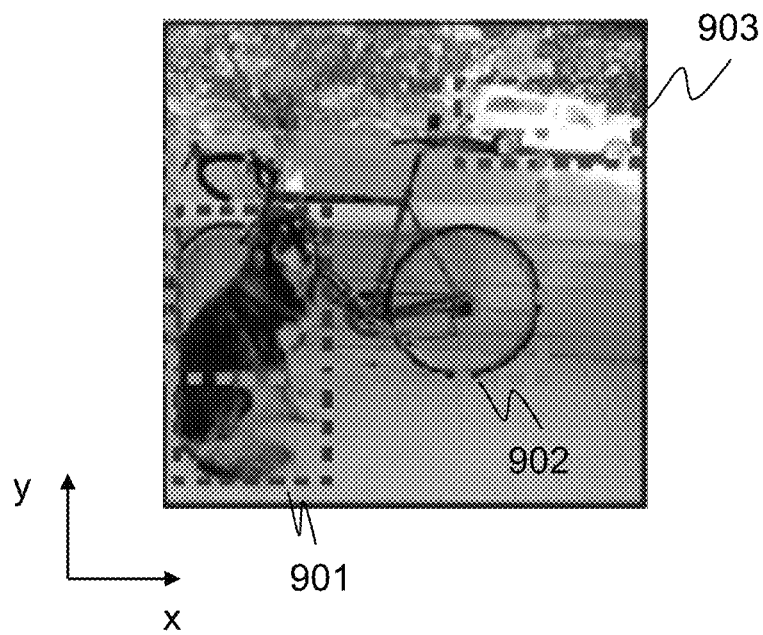
FIG. 9A is a schematic diagram of the markings of target objects in a sample image according to some embodiments of the present disclosure.

Specifically, as shown in FIG. 9A, which is a schematic diagram of the markings of target objects in a sample image. The target objects in the sample image illustrated in FIG. 9A may include a dog 901, a bicycle 902, and a car 903. When marking each target object, vertices of the target object may be identified. For example, vertices in four directions including positive x-direction, negative x-direction, positive y-direction, and negative y-direction (i.e., the left, right, top, and bottom directions of the sample image in FIG. 9A) may be identified in the sample image. The target objects 901 through 903 may be marked according to the identified vertices. In some embodiments, if the identified vertices of a target object include top and bottom vertices, two straight lines passing through the top and bottom vertices may be rendered as top and bottom sides of a rectangular box respectively. The two straight lines may be in parallel with the top and bottom sides of the sample image. In some embodiments, if the identified vertices of a target object include right and left vertices, two straight lines passing through the right and left vertices may be rendered as two sides of the rectangular box respectively. The two straight lines may be in parallel with the right and left sides of the sample image. Merely for illustration purposes, the target objects including the dog 901, the bicycle 902, and the car 903 may be enclosed in rectangular boxes of dotted lines as shown in FIG. 9A.

In 720, a first training feature vector corresponding to each marked target object may be determined. The first training feature vector may be determined according to the rectangular box in which each target object may be located. The first training feature vector may include category parameters of the target object in the rectangular box, and position parameters. In some embodiments, the position parameters may further include position of a pre-set point related to the rectangular box (e.g., the center of the rectangular box, a vertex of the rectangular box, etc.) and outline dimension parameters of the rectangular box (e.g., height, width, perimeter, etc.).

A target object in a sample image may correspond to a first training feature vector. In some embodiments, the first training feature vector may be a multi-dimensional vector. The first training feature vector may include at least one or more category parameters and position parameters. Each of the one or more category parameters may correspond to a certain category to which a target object may belong. As mentioned above, the position parameters may further include position information of a pre-set point related to the rectangular box, and outline dimension parameters of the rectangular box. In the process 700, the way to determine the position information in the first training feature vector corresponding to each target object may be the same as that to determine the position information in a feature vector in an object detection process (e.g., the process 300). For example, in the training process, the vertex at the top-left corner of the rectangular box (i.e., the top-left vertex) may be taken as the pre-set point. The position information of the top-left vertex may be determined as the position information of the pre-set point. The position information determined in the object detection process may also be the position information of the top-left vertex of an rectangular box in which an object is enclosed. In other words, the method used to determine the position information may be applied both in the training process and the object detection process.

In 730, the convolutional neural network may be trained based on the sample images with determined first training feature vectors.

In some embodiments, all of the sample images in the sample image batch may be used to train the convolutional neural network. Generally, the sample image batch may include a large number of sample images. In order to improve efficiency in the training process, a sample image sub-batch may be obtained. The sample image sub-batch may be obtained by selecting a portion of sample images from the sample image batch. The number of the sample images in the sample images sub-batch may be much smaller than that in the sample image batch. The convolutional neural network may be trained with the selected sample images in one or more sample image sub-batches.

In some embodiments, sample images in a sample image sub-batch may be randomly selected to train the convolutional neural network. One or more parameters of the convolutional neural network may be updated in a plurality of iterations in the training process. In some embodiments, the one or more parameters may include weights used in the convolutional neural network. The training process may terminate until a deviation between marked information and predicted information of a target object converges, for example, to a predetermined threshold. As used herein, the marked information may refer to the category parameters and position parameters determined based on the marking of a target object in a sample image. The predicted information may refer to the category parameters and position parameters determined in object detection process when the sample image is input into a convolutional neural network.

When marking target objects in sample images, the first training feature vector corresponding to each target object in the sample images may be determined. The first training feature vector corresponding to each target object may be expressed as (x, y, w, h, cls1, cls2, cls3, . . . , clsn), where x, y, w, and h may be position parameters. The position parameters x and y may represent position information of a pre-set point related to the rectangular box in which the target object may be located. In some embodiments, the pre-set point may be any one of the four vertices of the rectangular box, such as the top-left vertex, or the center point of the rectangular box. The other two position parameters w and h may be outline dimension parameters of the rectangular box, for example, the width and the height of rectangular box.

The convolutional neural network may be used to detect various types of target objects. Thus there may be a plurality of category parameters representing various types of target objects. In some embodiments, category parameters cls, including cls1, cls2, . . . , clsn may represent target objects belonging to different categories, where n may be the number of the different categories. For example, n may be 20, which means there may be 20 kinds of objects. Merely for illustration purposes, cls1 may represent a car, cls2 may represent a dog, and cls3 may represent a bicycle. The value of the category parameters cls1, cls2, . . . , clsn may be determined based on a category of the target object. In some embodiments, if the target object belongs to a certain category, the category parameter representing the certain category may be set to 1, and other category parameters in the first training feature vector may be set to 0. Referring again to FIG. 9A, in the feature vector corresponding to the dog 901, the category parameter cls2 that represents a dog may be set to 1, and other category parameters may be set to 0. In the feature vector corresponding to the bicycle 902, the category parameter cls3 that represents a bicycle may be set to 1, and other category parameters may be 0. And in the feature vector corresponding to the car 903, the category parameter cls1 that represents a car may be set to 1, and other category parameters may be set to 0.

The position parameters x and y in the first training feature vector may indicate position information of a pre-set point. The values of x and y may be abscissa value and ordinate value of the pre-set point in a coordinate system respectively. In some embodiments, the pre-set point may be a certain point in the rectangular box enclosing the target object. For example, the pre-set point may be the top-left vertex of the rectangular box, or the center point of the rectangular box. The abscissa value and ordinate value of the pre-set point may be determined according to a reference point in the sample image. The reference point may be a top-left vertex of the sample image, a top-right vertex of the sample image, or the like. In some embodiments, the reference point may be same as the pre-set point. In some embodiments, the reference point may differ from the pre-set point. The reference point in the sample image may be the origin of the coordinate system, and the values of x and y of the pre-set point related to each rectangular box may be determined based on the reference point. For example, the abscissa value x and ordinate value y may be determined based on the position of the pre-set point in the coordinate system relative to the reference point (i.e., the origin of the coordinate system). The outline dimension parameters w and h may respectively correspond to the width and height of the rectangular box in which the target object may locate.

After marking the sample images, the training process of the convolutional neural network may be started. A plurality of sample images in a sample image sub-batch may be used to train the convolutional neural network. In some embodiments, the convolutional neural network may include multiple pairs of convolutional layers and down-sampling layers, and a single convolutional layer as described in FIG. 6B. In the training process, convolution operations and down-sampling operations may be performed on the sample images for one or more times. A convolutional feature map of each sample image may be obtained after each convolution operation. A down-sampling operation may be performed on the convolutional feature maps to decrease the resolution of the sample images, so as to reduce calculation and improve efficiency of the training process.

A convolutional feature map may be obtained in the single convolutional layer. The single convolutional layer may connect with a region proposal selection module in the convolutional neural network. The region proposal selection module may include two fully connected convolutional layers that are connected in parallel as illustrated in FIG. 6C. The two fully connected convolutional layers may determine a category feature map and a region feature map based on the convolutional feature map. Position parameters of a plurality of regions and the probability that an object exists in each of the plurality of regions may be determined based on the category feature map and the region feature map. In some embodiments, a probability threshold may be set, for example, by a user. A region with a probability larger than the probability threshold may be taken as a region proposal. Position parameters of each region proposal may be determined based on the region feature map.

A rectangular box may be used to mark a target object in a sample image. In spite of one or more down-sampling operations performed on the sample image within the convolutional neural network, each region proposal may still remain a rectangular box in a region feature map, for example, a region feature map determined in the single convolutional layer 633. The predicted position parameters x, y, w and h corresponding to each region proposal in the region feature map may be determined according to the size of each region proposal and the down-sampling operations performed in the convolutional neural network. The predicted position parameters corresponding to each region proposal may be the position parameters corresponding to a region in the sample image obtained by restoring the region proposal.

A probability that an object exists in a region proposal may be predicted based on the category feature map determined by the region proposal selection module. If it is predicted that an object exists in the region proposal, the probability value may be 1, otherwise the probability value may be 0. In some embodiments, if it is predicted that an object exists in the region proposal, the probability value may be any other values larger than 0. For example, the probability value may be 0.7, 0.9, etc.

In some embodiments, a target detection module may connect with the region proposal selection module in the convolutional neural network. The target detection module may include an adaptive down-sampling layer and a fully connected layer. The adaptive down-sampling layer may connect with the fully connected layer, for example, as illustrated in FIG. 6B. In some embodiments, the region proposal selection module may predict region proposals of different sizes. Thus the down-sampling layer for resizing the region proposals of different sizes into a particular size may be set before the fully connected layer.

Each region proposal in which an object may exist may be identified using the category feature map determined by the region proposal selection module. Each region proposal having an uncertain size in which an object may exist may be converted into a region proposal of a particular size in the adaptive down-sampling layer.

A first training feature vector (x, y, w, h, cls1, . . . , cls20) corresponding to each region proposal in a sample image may be predicted based on calculation in the fully connected layer of the convolutional neural network. The position parameters x, y, w, and h in the first training feature vector may be predicted based on the region proposal mentioned above. Each category parameter in the first training feature vector may indicate a probability that an object in the region proposal belongs to a certain category. In some embodiments, the probability may be a value between 0 and 1.

In the training process, the deviation between the predicted information and marked information of each sample image may be determined. In some embodiments, the deviation may be used to adjust one or more parameters of the convolutional neural network. The convolutional neural network may be trained in a plurality of iterations. During each of the plurality of iterations, a plurality of sample images in a sample image sub-batch may be obtained to train the convolutional neural network. The one or more parameters may be updated in the training process until the deviation between the predicted information and marked information of each region proposal converges, for example, to a predetermined threshold.

In some embodiments, the convolutional neural network may identify a person in the front window area of a vehicle. The person in the front window area may be a driver, or a passenger. In a training process of the convolutional neural network for detecting a person in a vehicle, a plurality of sample images may be selected. In some embodiments, a large number of positive sample images and negative sample images may be selected. As used herein, a positive sample image may refer to an image that includes the front window area of a vehicle, and a negative sample image may refer to an image that does not include the front window area of a vehicle. In some embodiments, the person in a sample image may be marked with a method same as or similar to the method for marking an object in an image as described above, for example, in FIG. 9A. More particular, a rectangular box may be used to enclose the person in the front window area. Similarly, the determination of the rectangular box may be same as or similar to the embodiment disclosed in an object detection process set forth above, for example, in FIG. 3D. A category corresponding to a certain object may be determined as a certain category parameter. In some embodiments, a category corresponding to a person may be determined as cls1, and a category corresponding to other objects (e.g., a dog, a bag, etc.) in the front window area of a vehicle may be determined as cls2. In some embodiments, a first category corresponding to a driver may be determined as cls1, a second category corresponding to a passenger may be determined as cls2, and a third category corresponding to other objects in the vehicle window area may be determined as cls3.

The training process of the convolutional neural network based on a first training feature vector (x, y, w, h, cls1, . . . , clsn) corresponding to each marked object may be same as or similar to the process 700 set forth above. Thus a trained convolutional neural network may detect a person in the front window area of a vehicle.

In some embodiments, the convolutional neural network may be further configured to detect whether a person in the front window region fastens a seat belt. An object may be determined to be a person in the front window area according to the category and position information of the object in the region proposal. After identifying a person in the front window area, another convolutional neural network may be provided to detect whether the person fastens the seat belt. The convolutional neural network for detecting a seat belt may be same as or different from that for detecting a person in the front window area.

In the training process of the convolutional neural network for detecting a seat belt, the position of a driver in a driver region proposal in a sample image of a sample image batch may be detected with a detection model. Then the convolutional neural network may be trained based on sample images. Each of the sample images may include a driver image, and may also include information about whether the driver fastens the seat belt.

In some embodiments, the sample image batch may include a large number of sample images. Each sample image may include a front window area of a vehicle. In some embodiments, a sub-area which includes two-thirds of the front window area on the right side of the vehicle in the sample images may be determined as the driver region proposal. The position of a driver may be detected in the driver region proposal using a detection model. In some embodiments, the detection model may include a face detection model and a head-shoulder detection model. For example, a head-shoulder detection model may be used to detect the position of a driver. The head-shoulder detection model may detect areas in the driver region proposal that include the head and the shoulder of a driver, respectively. The image corresponding to the areas which include the head and shoulder of a driver may be determined as a driver image. In some embodiments, a plurality of driver images may be obtained based on sample images in the sample image batch.

Information about whether each driver fastens the seat belt may be made based on the driver images. The convolutional neural network may be trained based on the driver images and the information about whether each driver fastens the seat belt.

In some embodiments, a normalization operation may be performed on each driver images before the training process of the convolutional neural network is started. The normalization operation may resize each driver image. The normalized images of drivers may have a same size.

Merely for illustration purposes, the convolutional neural network may include a convolutional layers, a ½ down-sampling layer, a direct connection layer, and a regression layer. The convolutional layer may perform convolution operation on input images using a plurality of convolution kernels. The ½ down-sampling layer may perform ½ down-sampling operation on the input images. The ½ down-sampling operation may combine a pixel in a horizontal direction and another pixel in a vertical direction in an image into one pixel so as to decrease image resolution. The directly connected layer may be a conventional neural network connection. Each node in the direct connection layer may connect with an output node of the former layer. The regression layer may perform a regression operation on input features, and output a determination result.

Figure 10:
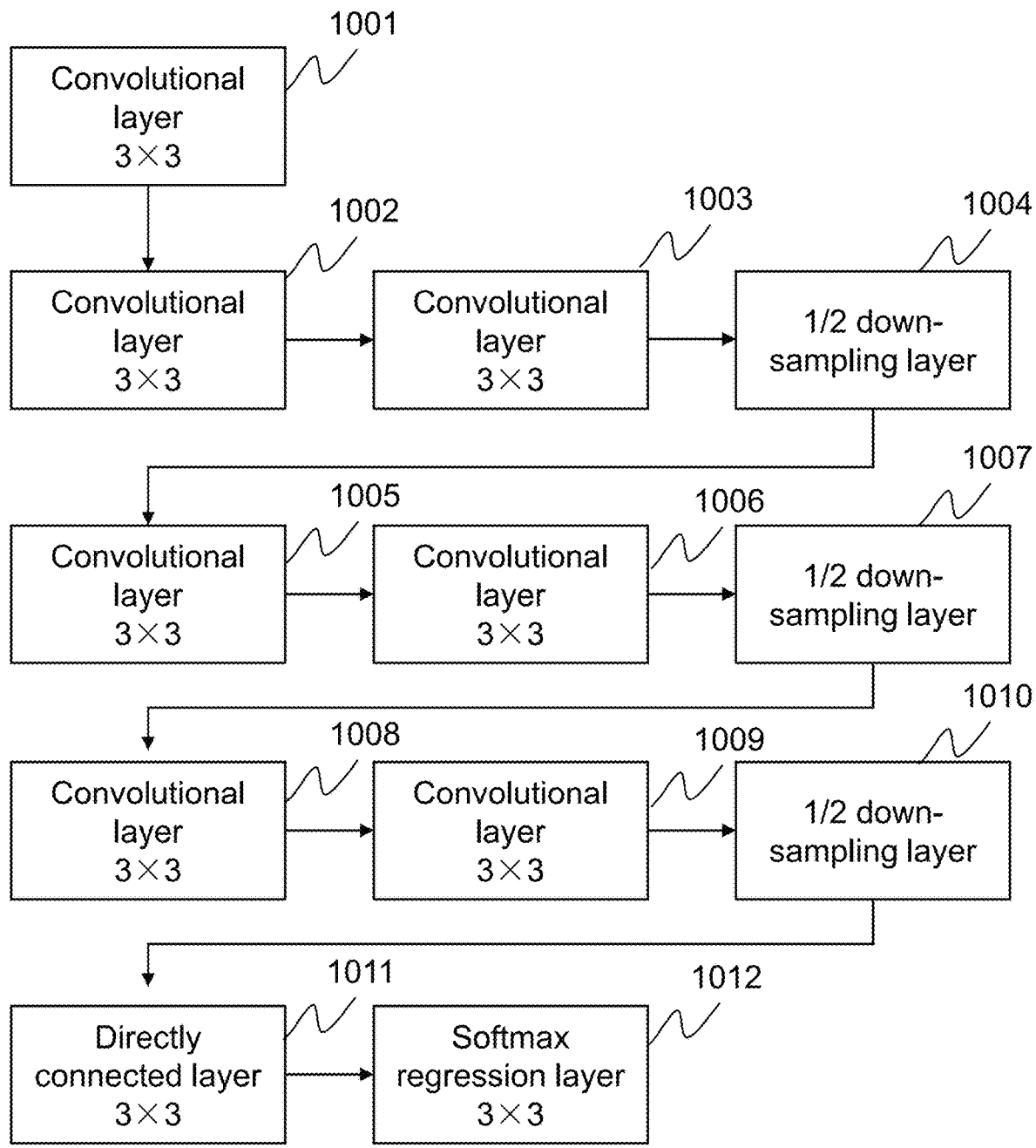
FIG. 10 is a block diagram illustrating an exemplary structure of the convolutional neutral network according to some embodiments of the present disclosure.

FIG. 10 is a block diagram illustrating an exemplary structure of the convolutional neutral network according to some embodiments of the present disclosure. The convolutional neutral network 1000 may obtain a driver image as its input. In some embodiments, a driver image may be normalized before being input into the convolutional neutral network. For example, the normalized driver image may have a size of 64×64. As illustrated in FIG. 10, the convolutional neutral network may include seven convolutional layers 1001, 1002, 1003, 1005, 1006, 1008, and 1009, three ½ down-sampling layer 1004, 1007 and 1010, a directly connected layer 1011, and a Softmax regression layer 1012. In some embodiments, a convolutional layers may include a plurality of convolution kernels. Different convolutional layers may include different number of convolution kernels. Merely by for illustration purposes, each of the convolutional layers 1001 through 1003 may have 48 convolution kernels, each of the convolutional layers 1005 and 1006 may have 96 convolution kernels, and each of the convolutional layers 1008 and 1009 may have 128 convolution kernels. The convolution kernels may have a particular size, for example, 3×3. The directly connected layer 1011 may have a plurality of nodes, for example, 400 nodes.

Normalized driver images may be input into the convolutional neural network. The driver images may be processed through three convolutional layers 1001, 1002, and 1003 with kernel sizes of 3×3. The ½ down-sampling layer 1004 may connect with the convolutional layer 1003, and may perform a down-sampling operation on the processing results of the convolutional layer 1003. The output of the ½ down-sampling layer 1004 may be input into another two convolutional layers 1005 and 1006 with kernel sizes of 3×3. Then the processing results of the convolutional layer 1006 may be sent to another ½ down-sampling layer 1007. The output of the ½ down-sampling layer 1007 may be input into another two convolutional layers 1008 and 1009 with kernel sizes of 3×3. The processing results of the convolutional layer 1009 may be input into another ½ down-sampling layer 1010. The ½ down-sampling layer may connect with the direct connection layer 1011, which further connect with the Softmax regression layer 1012. Processing results of the driver images may be output from the Softmax regression layer 1012.

After the training process of the convolutional neural network is terminated, a detection on whether a driver fastens a seat belt may be performed in the front window area. The convolutional neural network may have powerful feature learning capacity, and may deal with problems resulted from user operations. Besides, the convolutional neural network with 12 layers and small convolution kernels may ensure the accuracy as well as reduce the calculation in the training process.

In some embodiments, the convolutional neural network may be used to identify the position information as well as category information of objects in the same time, which may facilitate holistic optimization of the detection process. Besides, during the object detection process, region proposals may be determined and a feature vector corresponding to each region proposal may be calculate. Category and position of each object may be identified based on the feature vector. There may be no repetitive operations in the object detection process, which may the instantaneity and the efficiency of the detection.

FIG. 8 is a flow chart illustrating an exemplary training process of the convolutional neural network according to some embodiments of the present disclosure. The process may be executed by an image processing electronic device, such as the server 303 and/or the user device 340. For example, the process may be implemented as a set of instructions stored in the image processing electronic device. The image processing electronic device (e.g., a processor, logic circuits, and/or modules thereof) may execute the set of instructions and may accordingly be directed to perform the process.

In 810, target objects in sample images selected from a sample image batch may be marked. A target object may be marked with an arrow, a star, a triangle, a rectangular box, or the like, or a combination thereof. In some embodiment, a target object in a sample image may be marked by enclosing the target object in a rectangular box.

The convolutional neural network may be trained with a large number of sample images. The large number of sample images may be stored as a sample image batch. In some embodiments, the sample image batch may be divided into a plurality of sub-batches. Target objects in sample images in the sub-batches may be marked to train the convolutional neural network. Merely by ways of example, target objects may be marked in a manner similar to the manner in which the dog 901, the bicycle 902, and the car 903 are marked as FIG. 9A.

In 820, each sample image may be divided into a plurality of grids, and a second training feature vector corresponding to each grid may be determined. In some embodiments, each sample image may have a target size. A determination as to whether a grid in the plurality of grids include the center point of a target object may be made. If the grid includes the center point of a target object, the second training feature vector corresponding to the grid may be determined. In some embodiments, the second training feature vector may include at least a plurality of category parameters and position parameters. More particular, a category parameter which represents the certain category of the target object in the second training feature vector corresponding to the grid may be set to a predetermined value. In some embodiments, the predetermined value may be a maximum value among the values of all the category parameters in the second training feature vector. The value of the position parameters of the center point of the target object may be determined based on the position of the center point in the grid. The value of the outline dimension parameters in the second training feature vector may be determined based on the size of the rectangular box enclosing the target object. If the grid does not include the center point of a target object, the values of all the parameters in the second training feature vector corresponding to the grid may be set to 0.

The sample images may be divided into a plurality of grid in a predetermined manner. In some embodiments, the manner in which the sample images are divided in the training process may be the same as or similar to the manner used in the object detection process. In some embodiments, the image may be divided into multiple irregular grids. In some embodiments, the image may be divided into a plurality of grids with regular shapes. For example, the sample images may be divided, with a plurality of transverse lines and vertical line, into a plurality of grids in forms of multiple rows and columns. The distances between adjacent transverse lines or vertical lines may be same or different.

Figure 9B:
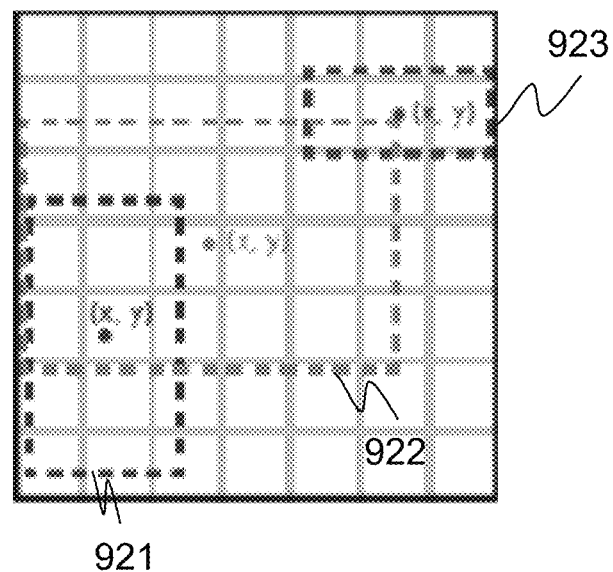
FIG. 9B illustrates rectangular boxes used for marking the objects according to some embodiments of the present disclosure.

In some embodiments, the number of rows and columns may be different. Alternatively, the number of rows and columns may be different. The length-to-width ratio of each grid may be same or different. For example, the sample image may be divided into a plurality of grids of 12×10, 15×15, 6×6, or the like. When the plurality of grids have a same size, the grids may be normalized. For example, as shown in FIG. 9B, a sample image may be divided into a plurality of grids including 7 rows in horizontal direction and 7 columns in vertical direction. Since each grid has a square shape, the size of each normalized grid may be 1×1.

Each grid in the sample image may correspond to a second training feature vector, and the second training feature vector may be a multi-dimensional vector. In some embodiments, the second training feature vector may include at least a plurality of category parameters and position parameters. The position parameters may further include position information of the center point of the target object and outline dimension parameters of the rectangular box enclosing the target object.

In 830, the convolutional neural network may be trained based on the sample images, in which the second training feature vector corresponding to each grid may be determined.

In some embodiments, all of the sample images in the sample image batch may be used to train the convolutional neural network. In some embodiments, a sample image sub-batch may be used to train the convolutional neural network. The sample image sub-batch may be obtained by selecting some images from the sample image batch.

The convolutional neural network may be trained by randomly selecting sample images in the sample image sub-batch. One or more parameters of the convolutional neural network may be updated in a plurality of iterations in the training process. In some embodiments, the one or more parameters may be weights of the convolutional neural network. The training process may terminate until the deviation between marked information and predicted information of a target object converges, for example, to a predetermined threshold.

In some embodiments, the sample images used to train the convolutional neural network may have a target size. Sample images of different sizes may be resized before being divided into grids. In some embodiments, the way to resize the sample images may be same as that to resize the obtained image in an object detection process, for example, the process 400 or the process 500.

When marking target objects in a sample image, the second training feature vector corresponding to each target object in the sample image may be determined. In some embodiments, the second training feature vector may be expressed as (confidence, cls1, cls2, cls3, . . . , cls20, x, y, w, h). The confidence may be a probability parameter, cls1, cls2, cls3, . . . , cls20 may be category parameters, and x, y, w and h may be position parameters. Position parameters x and y may represent position information of the center point of a target object. And position parameters w and h may represent outline dimension parameters. If a grid includes the center point of the target object, the value of each parameter in the second training feature vector corresponding to the grid may be determined respectively. If the grid does not include the central point of the target object, the value of each parameter in the second training feature vector corresponding to the grid may be set to 0.

To be specific, since each target object is marked by enclosing the target object in a rectangular box, the center point of the rectangular box may be considered as the center point of the target object. Merely by ways of example, the center points of the three rectangular boxes 921, 922 and 923 shown in FIG. 9B may be considered as the central points of the dog 901, the bicycle 902 and the car 903 in FIG. 9A, respectively. If a grid includes the center point of a target object, the probability parameter confidence in the second training feature vector corresponding to the grid may be set to 1. That is, the probability that a target object exists in the grid may be 100%.

Since the sample images include target objects of various categories, category parameter cls, including cls1, cls2, ... , clsn may be used to represent target objects of different categories. For example, n may be 20, which means there may be 20 types of objects. Merely for illustration purposes, cls1 may represent a car, cls2 may represent a dog, and cls3 may represent a bicycle. If a grid includes the center point of a target object, the value of the category parameter corresponding to the target object may be set to a maximum value. The maximum value may be larger than a predetermined threshold. For example, the maximum value may be 1, and the predetermined threshold may be 0.4.

Figure 9C:
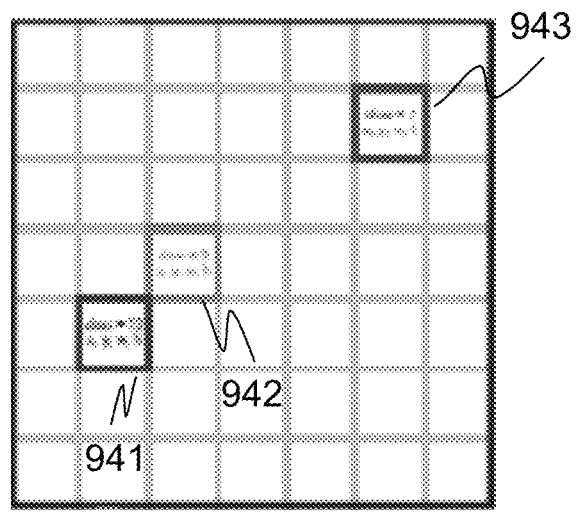
FIG. 9C is a schematic diagram of the grids including the center points of the target objects in a sample image according to some embodiments of the present disclosure.

Referring to FIG. 9C, a schematic diagram of the grids including the center points of the target objects in a sample image may be provided. In a direction from the bottom side to the top side of the sample image, three grids 941, 942 and 943 may be illustrated. The category parameters in the feature vectors of the three grids 941 through 943 may be determined. The three grids 941 through 943 may include the center points of the target objects 901 through 903 respectively. In a feature vector corresponding to the grid 941, the category parameter cls2 of may be 1, other category parameters may be 0. In a feature vector corresponding to the grid 942, the category parameter cls3 of may be 1, other category parameters may be 0. And in the feature vector corresponding to the grid 943, the category parameter cls1 may be 1, other category parameters of the feature vector may be 0.

The position parameters x, y, w and h of target objects in the feature vectors may be determined. The position parameters x and y may refer to position information of the center point of a target object. In some embodiments, a coordinate system may be established, and a reference point in the sample image may be determined as the origin of the coordinate system. In some embodiments, each grid in the sample images may correspond to a reference point. The position parameters x and y may respectively represent the abscissa value and ordinate value of the center point of the target object relative to the reference point. The reference point corresponding to each grid may be same or different. For example, the top-left vertex of a sample image may be determined as the reference point of a plurality of grids in the sample image. In some embodiments, each grid may be normalized so as to determine the coordinate of each center point in a grid. In some embodiments, the reference point corresponding to each grid may be different. For example, an independent coordinate system corresponding to each grid may be established, and the top-left vertex of the grid may be determined as the origin of the independent coordinate system (i.e., the reference point). Therefore, the values of x and y in the feature vector corresponding to a grid may be determined based on the position of the center point relative to the top-left corner of the grid. The outline dimension parameters w and h may refer to outline dimension of the rectangular box. More particularly, w and h may refer to the length and the width of the rectangular box in which the target object is enclosed.

Figure 9D:
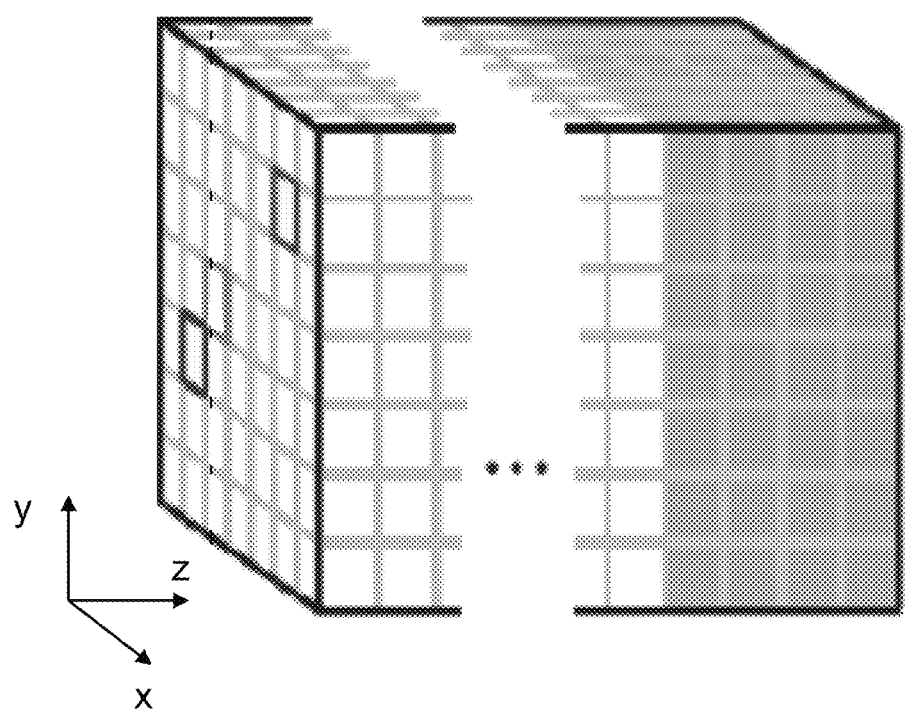
FIG. 9D is a schematic diagram illustrating a cube structure representing a feature vector according to some embodiments of the present disclosure.
Figure 12:
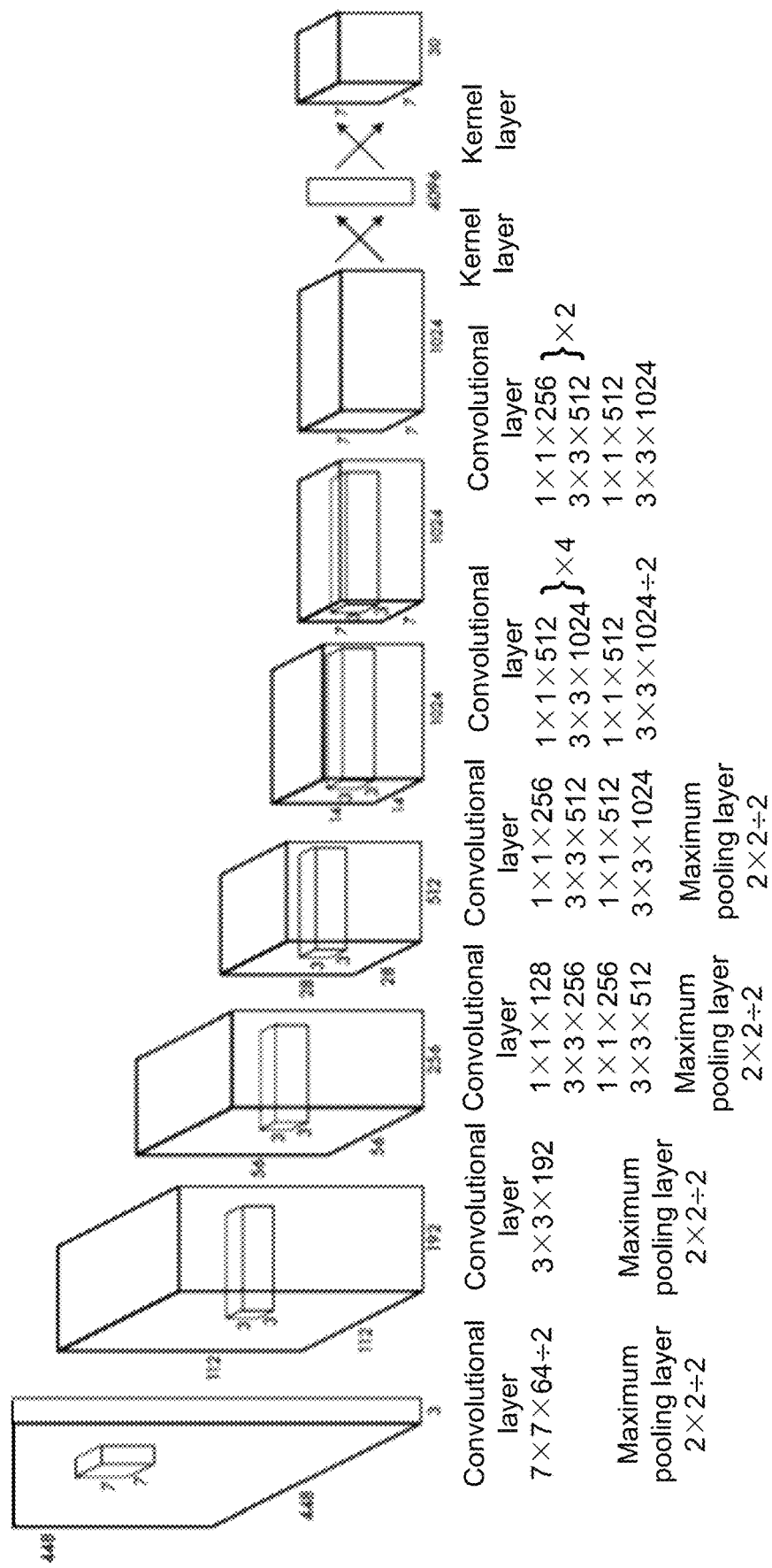
FIG. 12 is a schematic diagram illustrating an exemplary method for constructing the cube structure according to some embodiments of the present disclosure.

Since the feature vector is a multi-dimensional vector, a cube structure as illustrated in FIG. 9D may be built to show the feature vector corresponding to a grid more accurately. In some embodiments, the cube structure may be built with a method described in connection with FIG. 12. The grid may be processed through one or more layers to generate a cubic network structure. The one or more layers may include, for example, a convolutional layer, a max-pooling layer, a fully connected layer and an output layer. The depth of the cubic network structure in z-direction may be determined according to the dimensionality of the feature vector. For example, the depth of the cubic network structure in z-axis direction may be 25.

After marking target object in sample images in the manner set forth above, the convolutional neural network may be trained using the marked sample images. In the training process, one or more convolutional feature maps of each sample image in the sample image sub-batch may be obtained through the convolutional neural network. A convolutional feature map may include a second training feature vector (confidence, cls1, cls2, cls3, . . . , cls20, x, y, w, h) corresponding to each grid in the sample image. The second training feature vector may include predicted position parameters, category parameters and a probability parameter confidence of an object in the grid. The probability parameter confidence may represent the overlap between the rectangular box determined when predicting an object based on the grid, and the rectangular box determined when marking the object based on the grid.

In the training process of the convolutional neural network using sample images in sample image sub-batch, the deviation between the predicted information and marked information of each sample image may be determined. In some embodiments, the deviation may be used to adjust one or more parameters of the convolutional neural network. In some embodiments, the convolutional neural network may be trained in a plurality of iterations. During each of the plurality of iterations, a plurality of sample images in a sample image sub-batch may be obtained to train the convolutional neural network. The one or more parameters may be updated until the deviation between the predicted information and marked information of each grid converges, for example, to a predetermined threshold.

In some embodiments, in the training process, one or more functions or algorithms may be applied in the one or more layers of the convolutional neural network, so as to predict the position information and the category information of a target object with a higher accuracy. Merely for illustration purposes, a logic activation function may be applied in the fully connected layer being at output end of the convolutional neural network, and a Leaky ReLU function may be applied in the convolutional layer and other fully connected layers. The leaky ReLU function may be expressed in Equation (1):

$$\phi(x) = \begin{cases} x, & \text{if } x > 0 \\ 0.1x, & \text{otherwise,} \end{cases} \qquad (1)$$

To complete the training process of the convolutional neural network, a deviation related to the convolutional neural network may be determined. In some embodiments, the deviation may be determined, for example, through the convolutional neural network, based on the prediction to the position and category of the target objects in the sample images and the marked information of the target object in the sample images.

When the deviation converges, for example, to a predetermined value, the training process of the convolutional neural network may terminate. the deviation may be determined according to the loss function in Equation (2):

$$L = \lambda_{coord} \sum_{i=0}^{S^2} \sum_{j=0}^{B} (x_i - \hat{x}_i)^2 + $$
$$(y_i - \hat{y}_i)^2 + \lambda_{coord} \sum_{i=0}^{S^2} \sum_{j=0}^{B} I_{ij}^{obj} \left( \sqrt{w_i} - \sqrt{\hat{w}_i} \right)^2 + $$
$$\left( \sqrt{h_i} - \sqrt{\hat{h}_i} \right)^2 + \sum_{i=0}^{S^2} \sum_{j=0}^{B} I_{ij}^{obj} (c_i - \hat{c}_i)^2 + $$
$$\lambda_{noobj} \sum_{i=0}^{S^2} \sum_{j=0}^{B} I_{ij}^{noobj} (c_i - \hat{c}_i)^2 + \sum_{i=0}^{S^2} I_i^{obj} \sum_{c \in classes} (P_i(c) - \hat{P}_i(c))^2, \qquad (2)$$

wherein S may denote the number of rows or columns when the number of the rows equals to the number of the columns in the divided grids, B may denote a predetermined number of predicted rectangular boxes based on each grid. In some embodiments, the value of B may be 1 or 2. And $x_i$ may denote abscissa value of the center point of a marked target object in the grid i, $\hat{x}_i$ may denote abscissa of the center point of an predicted object in the grid i, $y_i$ may denote ordinate of the center point of the marked target object in the grid i, $\hat{y}_i$ may denote ordinate of the center point of the predicted object in the grid i, $h_i$ may denote the height of the rectangular box in which the marked target object is enclosed, $w_i$ may denote the width of the rectangular box in which the marked target object is enclosed, $\hat{h}_i$ may denote the height of the rectangular box where the predicted object is located, $\hat{w}_i$ may denote the width of the rectangular box in which the predicted object is enclosed, $c_i$ may denote a probability that a target object may exist in the grid i, $\hat{c}_i$ may denote a probability that an object may exist in the grid i as predicted, $P_i(c)$ may denote a probability that the target object in the grid i may belong to a category c, $\hat{P}_i(c)$ may denote a probability that the object in the predicted grid i may belong to the category c, $\lambda_{coord}$ and $\lambda_{noobj}$ may denote weight $I_{ij}^{obj}$ values, may be 1 when the center point of the object in the j-th rectangular box is located in the grid i, otherwise $I_{ij}^{obj}$ may be 0, $I_i^{obj}$ may be 1 when the center point of the object exists in the grid i, otherwise $I_i^{obj}$ may be 0, and $I_{ij}^{noobj}$ may be 1 when the center point of the object does not exist in the grid i, otherwise $I_{ij}^{noobj}$ may be 0. $\hat{P}_i(c)$ may be determined according to the following Equation (3):

$$P_r(Class_i|Object) * P_r(Object) = \hat{P}_i(c), \qquad (3)$$

wherein $P_r(Object)$ may denote a probability that an object may exist in the grid i, and $P_r(Class_j|Object)$ may denote a conditional probability that the object in the grid i may belong to the category c.

In some embodiments, when the deviation between the predicted information and the marked information is larger than a preset value, the above loss function may be applied so as to reduce the contribution to the prediction of the position of the object.

As shown in FIG. 9B, which illustrates rectangular boxes used for marking the objects according to some embodiment of the present disclosure, each sample image may be divided into 49 grids of 7×7. Each grid may be used to detect, for example, 20 categories of objects in images. Thus, 980 probability values may be generated when detecting an image. However, the probability values of most grids may be 0, which may lead to a discretization in the training process. A variable may be introduced to deal with the discretization. The variable may be a probability parameter $P_x(Object)$ indicating a probability that an object exists in a certain grid. Thus the feature vector may further include the probability parameter $P_x(Object)$ for predicting the probability that an object exists in a grid, other than the 20 category parameters. The parameter $\hat{P}_i(c)$ representing the probability that a target object in a grid belongs to a certain category c may be determined by multiplying $P_x(Object)$ by the conditional probability $P_x(Class_i|Object)$ that the object in the grid belongs to the category c. In the training process, $P_x(Object)$ may be updated for each grid, and $P_x(Class_i|Object)$ may be updated for the grid in which an object may exist.

Figure 11:
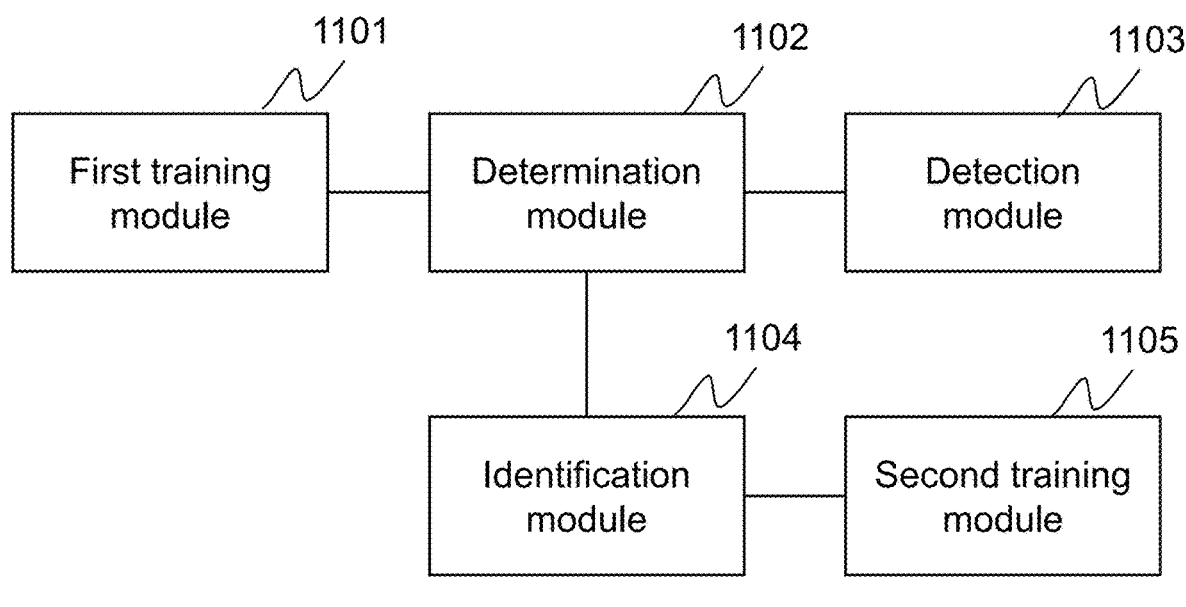
FIG. 11 is a schematic diagram illustrating an exemplary object detection system according to some embodiments of the present disclosure.

FIG. 11 is a schematic diagram illustrating an exemplary object detection system according to some embodiments of the present disclosure. The object detection system 1100 may include a first training module 1101, a determination module 1102, a detection module 1103, an identification module 1104, and a second training module 1105.

The determination module 1102 may be configured to determine a feature vector corresponding to a region proposal. The determination module 1102 may obtain a first convolutional neural network from the first training module 1101. The determination module 1102 may input a plurality of images into the first convolutional neural network. The determination module 1102 may further identify one or more region proposals in the input images. Each region proposal may include an object. In some embodiments, the determination module 1102 may perform a plurality of operations on each region proposal. Exemplary operations may include adaptive down-sampling, fully connection calculation, convolution, or the like, or a combination thereof. The determination module 1102 may determine a feature vector corresponding to each region proposal. The feature vector may include position parameters and category parameters of the region proposal.

The detection module 1103 may identify category information and position information of an object in a sample image. The detection module 1103 may obtain the feature vector from the determination module 1102. The feature vector may include position parameters and category parameters of the region proposal. The detection module 1103 may recognize a maximum value of a category parameter in the category parameters of the feature vector. If the maximum value is larger than a pre-set threshold, the detection module 1103 may determine a certain category represented by the category parameter with the maximum value to which the object may belong. The detection module 1103 may determine the position information of the object in the region proposal based on the position parameters in the feature vector.

To be specific, the detection module 1103 may determine the position information of a pre-set point relative to the image. The pre-set point may correlate to a rectangular box in which the object may be located. In some embodiments, the detection module 1103 may determine the position of the pre-set point relative to the image based on the position information of the pre-set point in the position parameters. The detection module 1103 may determine a region in which the rectangular box may be located may be determined based on the position information of the pre-set point and outline dimension parameters of the rectangular box. The region in which the rectangular box is located may be determined as the position of the object in the region proposal.

The first convolutional neural network may include multiple pairs of convolutional layers and down-sampling layers, and a single convolutional layer. The single convolutional layer may be in serial connection with two fully connected convolutional layer connected in parallel. The determination module 1102 may use the two fully connected convolutional layer to identify each region proposal in the images.

The first training module 1101 may train the convolutional neutral network. The first training module 1101 may train the convolutional neutral network to detect object in an image (e.g., a driver in a front window area of a vehicle). During the training process, the first training module 1101 may mark an target object with a rectangular box in each sample image in a sample image batch, and determine a first training feature vector corresponding to each target object based on each marked rectangular region in which the target object may be located. The first training feature vector may include a plurality of parameters, for example, category parameters of the target object in the rectangular box, position information of the pre-set point related to the rectangular box, and outline dimension parameters of the rectangular box. The first training module 1101 may train the first convolutional neural network based on the first training feature vector corresponding to each target object determined in the sample images.

More particularly, the first training module 1101 may obtain a sample image sub-batch by selecting sample images from the sample image batch. The number of the selected sample images in the sample image sub-batch may be less than the number of the sample images in the sample image batch. The first training module 1101 may train the first convolutional neural network using the selected sample images in the sample image sub-batch.

The identification module 1104 may identify features of the object in an image. For example, the features of the object may be information about whether a person in a vehicle fastens a seat belt. The identification module 1104 may obtain the feature vector of the object from the determination module 1102. In some embodiments, the identification module 1104 may obtain a second convolutional neural network from the second training module 1105. The identification module 1104 may identify the feature using the second convolutional neural network. When the object detected in the region proposal is a person, the identification module 1104 may identify whether the person in the region proposal fastens the seat belt.

The second training module 1105 may train a second convolutional neural network. During the training process, the second training module 1105 may detect the position of the object (e.g., the position of a driver) using a detection model in the driver region proposals in the sample image batch. The detection model may be a head-shoulder detecting model. The second training module 1105 may train the second convolutional neural network based on a plurality of driver images detected in the sample image batch and information about whether the driver fastens a seat belt.

Figure 13:
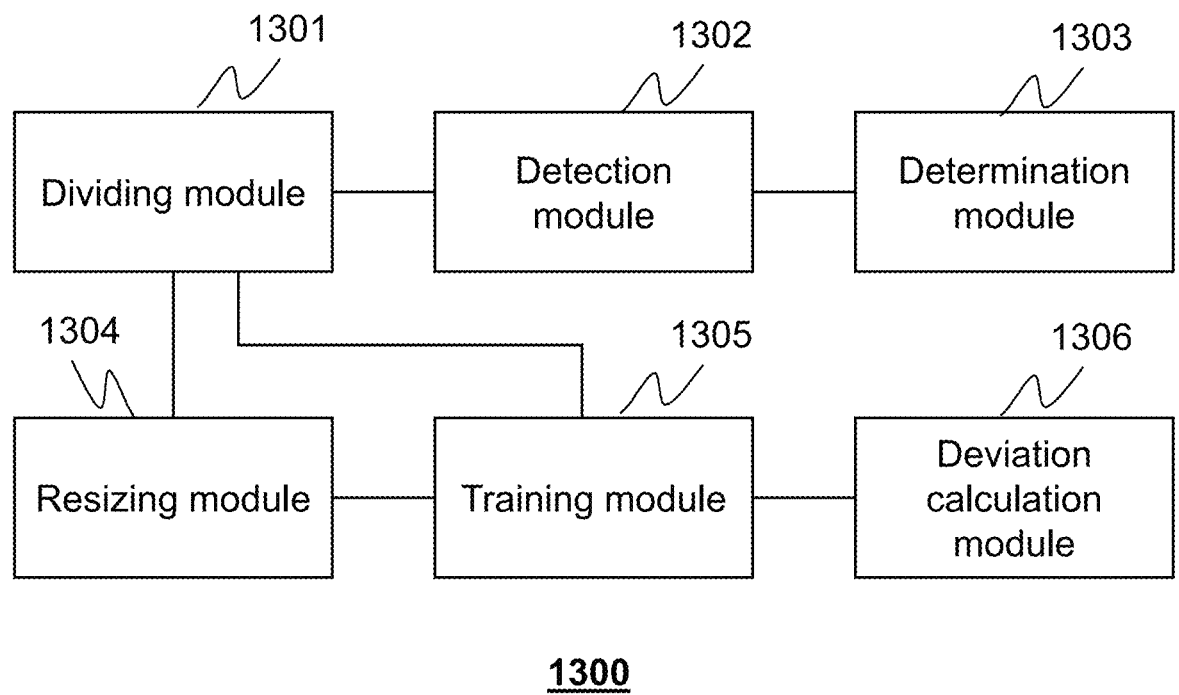
FIG. 13 is a schematic structural diagram of an object detection system according to some embodiments of the present disclosure.

FIG. 13 is a schematic structural diagram of an object detection system according to some embodiments of the present disclosure. The object detection system 1300 may be implemented in an electronic device, for example, a computer, a mobile phone, or a wearable device. The object detection system 1300 may include a dividing module 1301, a detection module 1302, a determination module 1303, a resizing module 1304, a training module 1305, and a deviation calculation module 1306.

The dividing module 1301 may be configured to divide an image into a plurality of grids. The dividing module 1301 may obtain a plurality of images which include one or more objects, such as a person, a vehicle, an animal, etc. In some embodiments, the images may have a target size. The dividing module 1301 may divide an image into grids in a predetermined manner. In some embodiments, the dividing module 1301 may divide the image into multiple irregular grids (e.g., a plurality of grids in forms of multiple rows and columns). In some embodiments, the dividing module 1301 may divide the image into multiple irregular grids.

The detection module 1302 may input one or more images into a convolutional neural network, and obtain a plurality of feature vectors output from the convolutional neural network. The detection module 1302 may receive divided images from the dividing module 1301, and input the divided images into a convolutional neural network. The convolutional neural network may determine a feature vector based on the divided images. In some embodiments, each grid in the divided image may correspond to a feature vector. The feature vector may include a plurality of parameters, including category parameters and position parameters of an object in the image.

The determination module 1303 may be configured to determine the category and the position of an object in an image. The determination module 1303 may receive the feature vectors from the detection module 1302. The determination module 1303 may identify the maximum value of the category parameters in the feature vector corresponding to each grid. If the maximum value is larger than a predetermined threshold, the category of the object may be determined. The determination module 1303 may further determine the position of the object. The position of the object may be determined according to the position of the center point of the object. In some embodiments, the size of the object may be further determined based on an outline dimension parameter of the position parameters in the feature vector.

The resizing module 1304 may be resize the input images. The resizing module 1304 may determine whether the input images have a target size. When receiving images of different sizes, the resizing module 1304 may adjust the size of the image to the target size.

The training module 1305 may be configured to train the convolutional neural network for detecting objects in images. In the training process, the training module 1305 may perform one or more of the following operations to train the convolutional neural network. Merely for illustration purposes, the training module 1305 may mark target objects in each sample image in a sample image batch with rectangular boxes. The training module 1305 may divide each sample image into a plurality of grids in a predetermined manner. The training module 1305 may further determine a second training feature vector corresponding to each grid. When a grid includes the center point of a target object, the training module 1305 may set the value of a category parameter representing a certain category to a maximum value according to the certain category to which the target object belongs. The training module 1305 may determine the value of the position parameter of the center point in the second training feature vector based on the position of the center point in the grid. Also, the training module 1305 may determine the value of the outline dimension parameter in the second training feature vector based on the size of the rectangular box in which the target object is enclosed. When the grid does not include the center point of the target object, the training module 1305 may set the value of each parameter in the second training feature vector corresponding to the grid to 0. The training module 1305 may train the convolutional neural network with a plurality of sample images, in which the second training feature vector corresponding to each grid is determined.

The training module 1305 may further be configured to determine whether each sample image has a target size. If the sample images have different sizes, the training module 1305 may resize the sample images to the target size.

The training module 1305 may also be configured to determine a sample image sub-batch by selecting sample images from a sample image batch. The number of the selected sample images in the sample image sub-batch may be less than that in the sample image batch. The training module 1305 may train the convolutional neural network using the selected sample images in the sample image sub-batch.

The deviation calculation module 1306 may determine the deviation related to the convolutional neural network. The deviation calculation module 1306 may calculate the deviation by determining the difference between the position and category of an object in an image, and the position and category of the marked target object in the image. The deviation calculation module 1306 may determine the deviation according to one or more algorithms, such as loss function, Softmax algorithm, leaky ReLU function, or the like. The deviation calculation module 1306 may determine whether the training process terminates based on the deviation. The deviation calculation module 1306 may determine whether the training process terminates based on the deviation. When the deviation converges to a certain value, the training module 1305 may terminate the training process of the convolutional neural network. The deviation calculation module 1306 may determine the deviation according to one or more functions or algorithms. Merely by ways of example, the functions or algorithms may include loss function, Softmax algorithm, leaky ReLU function, or the like, or a combination thereof.

The determination module 1303 may be further configured to determine the position information of the center point relative to a grid based on the position parameters of the center point. The determination module 1303 may also determine the center point, which may be used as the center point of the rectangular box, based on the position information. The determination module 1303 may determine the position information of the rectangular box according to the outline dimension parameter, and determine the position information of the rectangular box as the position information of the object. The determination module 1303 may determine a certain object category corresponding to the category parameter as the category of the object.

The determination module 1303 may use a pre-set point related to the grid as a reference point, and determine the position information of the center point in the grid according to the reference point and the position parameters of the center point.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. An image processing system configured to detect objects in images, comprising:
   a bus;
   at least one storage medium connected to the bus, including a set of instructions for object detection; and
   logic circuits in communication with the at least one storage medium via the bus, wherein when executing the set of instructions, the logic circuits:
     obtain first electronic signals including an image including an object;
     generate one or more feature vectors related to the image based on a first convolutional neural network, the one or more feature vectors including a plurality of parameters;
     determine a position of the object based on at least one of the plurality of parameters;
     determine a category associated with the object based on at least one of the plurality of parameters;
     determine that the object includes a predetermined scene; and
     obtain a first feature of the object in the image based on a second convolutional neural network, wherein the predetermined scene includes a person close to a window of a vehicle; and the first feature includes whether the person is fastened with a seat belt.

2. The system of claim 1, wherein the plurality of parameters include position parameters and category parameters, the position of the object is determined based on at least one of the position parameters, and the category associated with the object is determined based on at least one of the category parameters.

3. The system of claim 2, wherein the logic circuits further:
   select one or more region proposals in the image, wherein each region proposal includes an object; and
   generate the one or more feature vectors related to the image based on the first convolutional neural network, each region proposal corresponding to a feature vector.

4. The system of claim 3, wherein to obtain the first neutral network, the logic circuits:
   obtain a sample image including one or more target objects;
   enclose the one or more target objects in one or more rectangular boxes;
   generate one or more first training feature vectors corresponding to the one or more rectangular boxes; and
   train the first convolutional neural network based on the sample image including the one or more first training feature vectors.

5. The system of claim 3, wherein the position parameters of a feature vector of the one or more feature vectors include position information and outline dimension parameters of the region proposal,
   the position information of the region proposal is determined based on a position of a reference point related to a rectangular box in which the object is enclosed, and the reference point includes at least one of a vertex of the rectangular box or a center point of the rectangular box.

6. The system of claim 3, wherein the first convolutional neural network includes two fully connected convolutional layers being connected in parallel, the two fully connected convolutional layers configured to identify the region proposals in the image.

7. The system of claim 2, wherein the logic circuits further:
   divide the image into a plurality of regions, each of the plurality of grids corresponding to a feature vector.

8. The system of claim 7, wherein to obtain the first convolution neural network, the logic circuits:
   obtain a sample image including one or more target objects;
   enclose the one or more target objects in one or more rectangular boxes;
   divide the sample image into a plurality of regions;
   generate one or more second training feature vectors corresponding to the plurality of regions; and
   train the first convolutional neural network based on the sample image including the one or more second training feature vectors.

9. The system of claim 7, wherein the logic circuits:
   normalize the image to the predetermined size in response to a determination that the image has a size different from a predetermined size.

10. The system of claim 2, wherein a first category parameter of the plurality of category parameters represents a probability that the object belongs to a first category represented by the first category parameter, and the logic circuits further determine that the object belongs to the first category when a value of the first category parameter is larger than a first value.

11. A method configured to implemented on at least one image processing device to detect objects in images, comprising:
- obtaining, by the at least one image processing device, an image including an object;
- generating, by the at least one image processing device, one or more feature vectors related to the image based on a first convolutional neural network, wherein the one or more feature vectors includes a plurality of parameters;
- determining, by the at least one image processing device, a position of the object based on at least one of the plurality of parameters;
- determining, by the at least one image processing device, a category associated with the object based on at least one the plurality of parameters;
- determining that the object includes a predetermined scene; and
- obtaining a first feature of the object in the image based on a second convolutional neural network, wherein the predetermined scene includes a person close to a window of a vehicle; and the first feature includes whether the person is fastened with a seat belt.

12. The method of claim 11, wherein the plurality of parameters include position parameters and category parameters, the position of the object is determined based on at least one of the position parameters, and the category associated with the object is determined based on at least one of the category parameters.

13. The method of claim 12, further comprising:
- selecting, by the at least one image processing device, one or more region proposals in the image, wherein each region proposal includes an object; and
- generating, by the at least one image processing device, the one or more feature vectors related to the image based on the first convolutional neural network, each region proposal corresponding to a feature vector.

14. The method of claim 13, wherein the first convolutional neural network is obtained by:
- obtaining a sample image including one or more target objects;
- enclosing the one or more target objects in one or more rectangular boxes;
- generating one or more first training feature vectors corresponding to the one or more rectangular boxes; and
- training the first convolutional neural network based on the sample image including the one or more first training feature vectors.

15. The method of claim 13, wherein the position parameters of a feature vector of the one or more feature vectors include position information and outline dimension parameters of the region proposal, the position information of the region proposal is determined based on a position of a reference point related to a rectangular box in which the object is enclosed, and the reference point includes at least one of a vertex of the rectangular box or a center point of the rectangular box.

16. The method of claim 13, wherein the first convolutional neural network includes two fully connected convolutional layers being connected in parallel, the two fully connected convolutional layers configured to identify the region proposals in the image.

17. The method of claim 12, further comprising:
- dividing, by the image processing device, the image into a plurality of regions, each of the plurality of grids corresponding to a feature vector.

18. The method of claim 17, wherein the first convolutional neural network is obtained by:
- obtaining a sample image including one or more target objects;
- enclosing the one or more target objects in one or more rectangular boxes;
- dividing the sample image into a plurality of regions;
- generating one or more second training feature vectors corresponding to the plurality of regions; and
- training the first convolutional neural network based on the sample image including the one or more second training feature vectors.

19. A non-transitory medium storing instructions, the instructions, when executed by at least one image processing device, causing the at least one image processing device to implement a method, comprising:
- obtaining, by the at least one image processing device, an image including an object;
- generating, by the at least one image processing device, one or more feature vectors related to the image based on a first convolutional neural network, wherein the one or more feature vectors includes a plurality of parameters;
- determining, by the at least one image processing device, a position of the object based on at least one of the plurality of parameters; and
- determining, by the at least one image processing device, a category associated with the object based on at least one the plurality of parameters;
- determining that the object includes a predetermined scene; and
- obtaining a first feature of the object in the image based on a second convolutional neural network, wherein the predetermined scene includes a person close to a window of a vehicle; and the first feature includes whether the person is fastened with a seat belt.

* * * * *